(12) United States Patent
Nakamura

(10) Patent No.: US 11,394,545 B2
(45) Date of Patent: Jul. 19, 2022

(54) COMMUNICATION SYSTEM, SERVER DEVICE, USER DEVICE, METHOD, AND COMPUTER PROGRAM

(71) Applicant: NTI, Inc., Yokkaichi (JP)

(72) Inventor: Takatoshi Nakamura, Tokyo (JP)

(73) Assignee: NTI, INC., Mie (JP)

( * ) Notice: Subject to any disclaimer, the term of this patent is extended or adjusted under 35 U.S.C. 154(b) by 390 days.

(21) Appl. No.: 16/466,410

(22) PCT Filed: Dec. 6, 2017

(86) PCT No.: PCT/JP2017/043764
§ 371 (c)(1),
(2) Date: Jul. 12, 2019

(87) PCT Pub. No.: WO2018/105638
PCT Pub. Date: Jun. 14, 2018

(65) Prior Publication Data
US 2019/0394036 A1    Dec. 26, 2019

(30) Foreign Application Priority Data
Dec. 6, 2016   (JP) ............................. JP2016-236509

(51) Int. Cl.
*H04L 9/32* (2006.01)
*H04L 9/12* (2006.01)
(Continued)

(52) U.S. Cl.
CPC .............. *H04L 9/12* (2013.01); *H04L 9/0869* (2013.01); *H04L 9/14* (2013.01)

(58) Field of Classification Search
USPC ........................................................ 713/168
See application file for complete search history.

(56) References Cited

U.S. PATENT DOCUMENTS

| 2005/0004923 A1* | 1/2005 | Park ..................... G06Q 30/02 |
| 2008/0292105 A1 | 11/2008 | Wan et al. |
| 2011/0305334 A1* | 12/2011 | Nakamura .......... H04L 63/0838 380/255 |

FOREIGN PATENT DOCUMENTS

| JP | 2004080663 A | 3/2004 |
| JP | 2009177684 A | 8/2009 |
| JP | 2009253650 A | 10/2009 |

OTHER PUBLICATIONS

International Search Report, PCT/JP2017/043764, dated Apr. 24, 2018, 2 pages.
(Continued)

*Primary Examiner* — Fatoumata Traore
*Assistant Examiner* — Samuel Ambaye
(74) *Attorney, Agent, or Firm* — Edell, Shapiro & Finnan, LLC

(57) ABSTRACT

The present invention provides a secure technique that allows two communication apparatus that perform encrypted communication to have a common initial solution. A large number of user apparatuses all have a function of generating the same solution under the same condition as far as the user apparatuses have the same initial solution, and can perform encrypted communication using solutions successively generated in synchronization from the same initial solution. All the user apparatuses and a server share the same initial solution and have a function of generating the same solution under the same condition and thus can generate synchronized solutions. The server generates synchronization information, which is information required to generate the initial solution but is not the initial solution itself (S2002), and transmits the synchronization information to at least one of two user apparatuses performing encrypted communication (S2003). The two user apparatuses generate the same initial solution based on the synchronization infor- (Continued)

mation (S1004). Then, the two user apparatuses perform encrypted communication (S1005).

13 Claims, 9 Drawing Sheets

(51) Int. Cl.
*H04L 9/08* (2006.01)
*H04L 9/14* (2006.01)

(56) References Cited

OTHER PUBLICATIONS

Menezes, et al., Chapter 13 key management techniques, Handbook of Applied Cryptography, 1997, 49 pages.

* cited by examiner

COMMUNICATION SYSTEM, SERVER DEVICE, USER DEVICE, METHOD, AND COMPUTER PROGRAM

TECHNICAL FIELD

The present invention relates to a communication technique. In particular, it relates to an encrypted communication technique.

BACKGROUND ART

For example, when a user pays on an online shop on the Internet or checks their account or sends money using Internet banking, the user uses their terminal to communicate with the server of the shop or the like over the Internet. Of course, it is necessary to prevent tapping of the communication by a malicious third party.

Not only in the cases of financial services on the Internet such as those described above, but also in the cases of other various types of communication, the encrypted communication technology is widely used to prevent tapping of communication.

As one of such technology, the inventor has already developed a certain technique and strived to make it popular. The technique the inventor has been proposed will be described below.

In summary, the technique assumes that two communication apparatuses communicate with each other over a network, such as the Internet. The two communication apparatuses have solution generation means that successively generates solutions, each of which is a string of characters of at least one type selected from among letters, numerals and symbols. The solution generation means generates the solutions based on an initial solution in such a manner that the same solution is always generated under the same condition. That is, the solution depends on the initial value. For example, the solutions generated by the solution generation means are pseudo-random numbers.

The two communication apparatuses further have encryption means. The encryption means performs a processing of encrypting transmission data to be transmitted into encrypted data using the solutions generated by the solution generation means. The two communication apparatuses further have transmission means that transmits the encrypted data generated by the encryption means to the communication apparatus on the other end of the communication.

The two communication apparatuses further have reception means that receives the encrypted data from the communication apparatus on the other end of the communication. The two communication apparatuses further have decryption means that performs a processing of decrypting the received encrypted data into the transmission data using the solutions generated by the solution generation means.

The two communication apparatuses that are to perform encrypted communication share the common initial solution, and therefore the solution generation means in the two communication apparatuses can generate the same solutions. In the present invention, such a situation is expressed as follows: the two apparatuses can generate synchronized solutions. Since the two communication apparatus can generate synchronized solutions, the encrypted communication between the communication apparatuses is highly secure.

If two apparatuses perform a common key encrypted communication, for example, the two apparatuses share an algorithm that defines the encryption or decryption processing and a common key used to perform the algorithm. With the communication apparatus proposed by the inventor described above, the solution generation means in the two communication apparatus communicating with each other successively generate new synchronized common solutions as described above. The encryption means and the decryption means in the two communication apparatuses use the common solutions as common keys that change at common timings, thereby achieving extremely high communication security.

The communication apparatus proposed by the inventor described above can not only generate a solution in each communication but also generate a new solution at a plurality of timings during encryption of the transmission data. For example, most frequently, the communication apparatus can divide the transmission data into a plurality of sections, each of which is encrypted and decrypted as a unit, and generate a new solution each time one section of data is generated. That is, the communication apparatus proposed by the inventor described above updates the common key used for encrypted communication each time at least one communication occurs or more frequently in some cases. In other words, the communication apparatus perform encrypted communication by successively generating one-time common keys. Therefore, the encryption strength is extremely high.

Note that what is changed by the solution described above is not necessarily the common key or other key but may be the algorithm.

With the communication apparatus described above, it is essential that the solutions generated by the solution generation means in the two communication apparatuses are synchronized with each other, and if the solutions cannot be synchronized, the two communication apparatuses cannot perform encrypted communication. Therefore, the two communication apparatuses are required to share a common same initial solution required to synchronize the solutions before performing encrypted communication.

However, it is difficult in some cases, such as when there are a large number of communication apparatuses, and two of the large number of communication apparatuses perform encrypted communication. For example, if the communication apparatuses are a large number of personal computers, cellular phones or smart phones, and two of the communication apparatuses perform exchange of e-mails as an example of the communication, the two communication apparatuses need to have a common initial solution before starting communication. In such a case, there are a vast number of pairs of communication apparatuses that require encrypted communication, and it is burdensome and difficult for all the pairs of communication apparatuses to have a common initial solution.

However, the inventor has also already proposed a technique for solving the above-described problem of allowing two communication apparatuses to have a common initial solution. The technique involves providing a control device that is connected to the Internet and manages encrypted communication between two communication apparatuses, in addition to the large number of communication apparatuses connected to the Internet. The control device transmits a common initial solution to two communication apparatuses before the communication apparatuses start encrypted communication.

The two communication apparatuses receive the common initial solution, and then the solution generation means in the two communication apparatuses can generate synchronized solutions.

CITATION LIST

Patent Literature

Patent Literature 1: Japanese Patent Laid-Open No. 2009-177684

SUMMARY OF INVENTION

Technical Problem

However, if the control device transmits the initial solution to two communication apparatuses, the initial solution transmitted from the control device to the two communication apparatuses may be stolen by a third party and exploited to tap the encrypted communication between the two communication apparatuses.

If the initial solution transmitted from the control device to the two communication apparatuses is encrypted, and the two communication apparatuses decrypt the encrypted initial solution before use, the possibility of the initial solution being stolen and exploited can be reduced. However, even though the initial solution is encrypted, the risk involved with transmitting the initial solution itself on the Internet cannot be totally eliminated.

An object of the present invention is to provide a secure technique that allows two communication apparatuses that are to perform encrypted communication among a large number of communication apparatuses to have a common initial solution required to successively generate synchronized solutions used for the encrypted communication.

Solution to Problem

To attain the object described above, the present invention provides the following.

The present invention provides a communication system comprising a large number of user apparatuses capable of communicating with each other via a network and a server apparatus that is connected to the network and controls communication between the user apparatuses.

Each of the user apparatuses included in the communication system has: user solution generation means capable of successively generating solutions based on an initial solution, the generated solution being a string of a predetermined number of characters of at least one type selected from among letters, numerals and symbols, and a same solution being always generated under a same condition; user encryption means that performs a processing of encrypting transmission data, which is to be transmitted, into encrypted data using the solution generated by the user solution generation means; user transmission means that transmits the encrypted data to another apparatus; user reception means that receives the encrypted data from another apparatus; and user decryption means that performs a processing of decrypting the received encrypted data using the solution generated by the user solution generation means into the transmission data. Furthermore, each of the user apparatuses is configured so that, if specified user apparatuses, which are two user apparatuses that are to perform encrypted communication, have a common initial solution, the specified user apparatuses are capable of encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses. Furthermore, each of the user apparatuses is configured to be capable of transmitting specification information, which is information that specifies both the specified user apparatuses, to the server apparatus from the user transmission means thereof.

The server apparatus includes: server reception means that receives the specification information from one of the specified user apparatuses; server solution generation means capable of generating solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses; synchronization information generation means that generates synchronization information, which is information required for the specified user apparatuses that obtain the same initial solution to synchronize the solutions between the specified user apparatuses, using the solution generated by the server solution generation means; and server transmission means that transmits the synchronization information to at least one of the specified user apparatuses.

The user apparatus and the server apparatus according to the present invention correspond to the communication apparatus and the control apparatus described in the section of Background Art.

Each user apparatus includes user solution generation means that corresponds to the solution generation means in the communication apparatus described in the section of Background Art, and the user solution generation means can successively generate solutions. If specified user apparatuses of the user apparatuses, which are two user apparatuses that perform encrypted communication, have a common initial solution, as with the communication apparatus described in the section of Background Art, the user solution generation means in the two user apparatuses can generate the same solutions in synchronization, and the two user apparatuses can perform encrypted communication using the solutions.

The server apparatus according to the present invention, which corresponds to the control apparatus described in the section of Background Art, has a function of allowing the specified user apparatuses to have a common initial solution, as with the control apparatus. The server apparatus includes server solution generation means, which is similar to the user solution generation means of each user apparatus. The server solution generation means can generate a solution that is the same as the solution generated by the user solution generation means in each user apparatus and is synchronized with the solution generated by the user solution generation means in each user apparatus. The server apparatus transmits the synchronization information to at least one of the specified user apparatuses. The synchronization information is not the initial solution itself but is information based on which the user apparatus having received the synchronization information can generate the initial solution. The synchronization information is generated using or based on the solution generated by the server solution generation means. In the present invention, the server apparatus transmits the synchronization information to at least one of the specified user apparatuses. However, since the synchronization information is not the initial solution itself, even if the synchronization information is stolen by a malicious third party, the malicious third party cannot tap the encrypted communication between the user apparatuses. When one of the specified user apparatuses is the only destination of the synchronization information transmitted by the server apparatus, the possibility of the synchronization information being stolen is lower than when the synchronization information is transmitted to both the specified user apparatus, and therefore, the possibility of the encrypted communication between the user apparatuses being tapped is also lower.

Of course, the server apparatus may encrypt the synchronization information and transmit the encrypted synchronization information to one of the specified user apparatuses. In such a case, the encrypted communication between the server apparatus and the user apparatuses may be any encrypted communication, such as known or well-known encrypted communication or encrypted communication using successively generated solutions, such as that proposed by the inventor. Since the server apparatus includes server solution generation means capable of generating the same solutions as those generated by the user solution generation means in all the user apparatuses, the server apparatus can synchronize the generated solutions with the solutions generated by all the user apparatuses. That is, the server apparatus including the server solution generation means has no particular difficulty in performing the same encrypted communication as the encrypted communication between the user apparatuses with the user apparatuses.

As described above, in the present invention, when the two user apparatuses as the specified user apparatuses perform encrypted communication, the user solution generation means in both the user apparatuses generate synchronized solutions. Furthermore, the server solution generation means in the server apparatus and the user solution generation means in each user apparatus can generate synchronized solutions.

The manner of synchronizing solutions in the two cases described above will be described. In the cases where the two user solution generation means generate synchronized solutions and the server solution generation means and the user solution generation means generate synchronized solutions, solutions are synchronized in the same manner. Therefore, in the following description, for simplicity, both the user solution generation means and the server solution generation means will be referred to simply as "solution generation means".

The solution generation means may generate the solution by substituting the initial solution into a formula including the current time as a variable. In this way, the solution generation means in two independent apparatuses at remote locations can generate synchronized solutions. This technique is similar to the synchronization technique referred to as time synchronization that has already been practically used in a token or the like that is widely practically used in the field of Internet banking or the like.

Alternatively, the solution generation means may generate a new solution by substituting a past solution into a predetermined formula and generate next new solution by substituting the generated new solution into the same formula. This technique is similar to the synchronization technique referred to as event synchronization that has already been practically used in the token described above or the like. When the event synchronization is used, the solutions generated by the two solution generation means are the same if the solutions have the same ordinal number. For example, provided that the solution is denoted by X, the two solution generation means may generate solutions according to an algorithm that generates the next solution according to a function $X_{n+1}=f(X_n)$. In this case, the solution generation means may retain the last generated solution and delete all the solutions preceding the last solution. That is, the solution generation means may retain only the solution required to generate the next solution. In this case, when the solution generation means is to generate the fourth solution, for example, the solution generation means generates the fourth solution by substituting $X_3$, which is the retained third solution, into the formula $X_{n+1}=f(X_n)$ (that is, $X_4=f(X_3)$). If a formula involving a plurality of past solutions, such as $X_{n+1}=f(X_n)+f(X_{n-1})$, is used, the solution generation means needs to retain the last two solutions. As can be seen from the above description, the solution generation means does not always require only one solution to generate a new solution. In the latter case, two initial solutions are used. Thus, a plurality of initial solutions, rather than a single initial solution, may be used.

As an aspect of the present invention, the inventor proposes a server apparatus that forms the communication system described above. The server apparatus has the same advantages as the communication system described above.

The server apparatus as an example of the present invention is a server apparatus that forms a communication system in cooperation with a large number of user apparatuses, the communication system including the large number of user apparatuses and the server apparatus, the user apparatuses being capable of communicating with each other via a network, and the server apparatus being connected to the network and controlling communication between the user apparatuses.

In this situation, each of the user apparatuses has: user solution generation means capable of successively generating solutions based on an initial solution, the generated solution being a string of a predetermined number of characters of at least one type selected from among letters, numerals and symbols, and a same solution being always generated under a same condition; user encryption means that performs a processing of encrypting transmission data, which is to be transmitted, into encrypted data using the solution generated by the user solution generation means; user transmission means that transmits the encrypted data to another apparatus; user reception means that receives the encrypted data from another apparatus; and user decryption means that performs a processing of decrypting the received encrypted data using the solution generated by the user solution generation means into the transmission data. Furthermore, each of the user apparatuses is configured so that, if specified user apparatuses, which are two user apparatuses that are to perform encrypted communication, have a common initial solution, the specified user apparatuses are capable of encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses. Furthermore, each of the user apparatuses is configured to be capable of transmitting specification information, which is information that specifies both the specified user apparatuses, to the server apparatus from the user transmission means thereof.

The server apparatus includes: server reception means that receives the specification information from one of the specified user apparatuses; server solution generation means capable of generating solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses; synchronization information generation means that generates synchronization information, which is information required for the specified user apparatuses that obtain the same initial solution to synchronize the solutions between the specified user apparatuses, using the solution generated by the server solution generation means; and server transmission means that transmits the synchronization information to at least one of the specified user apparatuses.

As an aspect of the present invention, the inventor also proposes a user apparatus that forms the communication system according to the present invention in cooperation with the server apparatus described above. The user apparatus has the same advantages as the communication system described above.

The user apparatus as an example has: user solution generation means capable of successively generating solutions based on an initial solution, the generated solution being a string of a predetermined number of characters of at least one type selected from among letters, numerals and symbols, and a same solution being always generated under a same condition; user encryption means that performs a processing of encrypting transmission data, which is to be transmitted, into encrypted data using the solution generated by the user solution generation means; user transmission means that transmits the encrypted data to another apparatus; user reception means that receives the encrypted data from another apparatus; and user decryption means that performs a processing of decrypting the received encrypted data using the solution generated by the user solution generation means into the transmission data. The user apparatus is configured so that, if specified user apparatuses, which are two user apparatuses that are to perform encrypted communication, have a common initial solution, the specified user apparatuses are capable of encrypted communication by the user solution generation means in each of the two user apparatuses generating common solutions synchronized between the specified user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses. The user apparatus further includes means that generates the initial solution using the specification information when receiving the synchronization information from the server apparatus.

Furthermore, as an aspect of the present invention, the inventor proposes a computer apparatus that forms the user apparatus according to the present invention in cooperation with a predetermined communication apparatus including the user transmission means and the user reception means. The computer apparatus includes the user solution generation means, the user encryption means, the user decryption means and the means that generates the initial solution. Examples of the predetermined communication apparatus include a smart phone and a cellular phone. Examples of the computer apparatus include a subscriber identity module (SIM) card that can be mounted on the predetermined communication apparatus.

The server apparatus may be configured to transmit, as the synchronization information, a solution from which the initial solution is generated to both the user apparatuses as the specified user apparatuses. In this case, the user apparatuses as the specified user apparatuses may be configured so that the user solution generation means in the user apparatus uses the solution transmitted from the server apparatus to generate a new solution under a same condition and designates the generated common solution as the initial solution, thereby allowing synchronization of the solutions between the specified user apparatuses.

In this case, the server apparatus transmits the solution as the synchronization information to both the two user apparatuses as the specified user apparatuses. The solution may or may not be generated by the server solution generation means. The user solution generation means in the user apparatus generates at least one solution based on the received solution, and uses the generated solution as an initial solution. That is, the solution transmitted from the server apparatus to the two user apparatuses in this case is not used as an initial solution for generating solutions used in the encrypted communication between the two user apparatuses but is used as an initial solution for the user solution generation means in the two user apparatuses to generate a common initial solution. As described above, the user solution generation means having a common solution can generate the same solution in synchronization under the same condition. If the user solution generation means in the two user apparatuses having received the solution as the synchronization information from the server apparatus share the same condition, the user solution generation means in the user apparatuses can generate the same solution and therefore can use the newly generated common solution as an initial solution.

The user solution generation means in the two user apparatuses may share the same condition in advance or through information transmitted from the server apparatus. If the user solution generation means synchronize solutions in a manner similar to the time synchronization used in the token or the like described above, for example, the condition may be that "a solution generated from a relevant solution as an initial solution at a specified time is used as a new initial solution (the specified time may be a past or future time, such as "0:00 on the day 100 days after the day on which the relevant solution is received, for example)". Alternatively, if the user solution generation means synchronize solutions in a manner similar to the event synchronization used in the token or the like described above, for example, the condition may be that "a solution of a specified ordinal number, such as the third solution, generated from a relevant solution as an initial solution is used as a new initial solution".

In any case, the synchronization information, which is a solution transmitted from the server apparatus to the two user apparatuses, is not used as an initial solution for the encrypted communication between the specified user apparatuses but is used only for generating an initial solution. Therefore, even if the synchronization information is stolen by a third party, the third party cannot tap the encrypted communication between the specified user apparatuses using the synchronization information.

The server apparatus may be configured to transmit, as the synchronization information, a solution capable of being generated by the user solution generation means in one of the specified user apparatuses from which the initial solution is generated to the other of the user apparatuses as the specified user apparatuses. In this case, the one of the specified user apparatuses that does not receive the synchronization information may be configured to designates a new solution generated under a predetermined condition by the user solution generation means as an initial value, and the other of the specified user apparatuses that receives the synchronization information may be configured so that the user solution generation means uses the solution transmitted from the server apparatus to generate a new solution under the same condition as the condition under which the user solution generation means in the one user apparatus generates a new solution, and designates the generated new solution as an initial solution, thereby allowing synchronization of the solutions between the specified user apparatuses.

In this case, the server apparatus transmits the solution as the synchronization information to the other of the two user apparatuses as the specified user apparatuses. The solution can be generated by the user solution generation means in the one of the two user apparatuses as the specified user apparatuses. As described above, the server solution generation means in the server apparatus can generate solutions synchronized with the solutions generated by the user solution generation means in all the user apparatuses. Therefore, the user apparatus can grasp the solution that can be generated by the user solution generation means in the one of the two user apparatuses as the specified user apparatuses.

In this case, the one of the specified user apparatuses that does not receive the synchronization information uses the new solution generated by the user solution generation means thereof under the predetermined condition as an initial value. On the other hand. In the user apparatus that receives the synchronization information of the specified user apparatuses, the user solution generation means uses the solution transmitted from the server apparatus to generate a new solution under the same condition as the condition under which the user solution generation means in the one user apparatus generates a new solution, and designates the generated solution as an initial solution. That is, the one of the specified user apparatus uses the solution generated by itself (as an initial solution) to generate an initial solution used for encrypted communication between the specified user apparatuses, and the other of the specified user apparatuses uses the solution as the synchronization information transmitted from the server apparatus as an initial solution to generate a new initial solution.

The same condition shared by the solution generation means in the two user apparatuses may be shared between the two user apparatuses in advance or through information transmitted from the server apparatus. Details of the condition are the same as those described above.

In this case also, the synchronization information as the solution transmitted from the server apparatus to the other of the specified user apparatus is not used as an initial solution for the encrypted communication between the specified user apparatuses but is used only for generating the initial solution. Therefore, even if the synchronization information is stolen by a third party, the third party cannot tap the encrypted communication between the specified user apparatuses using the synchronization information. In addition, in this case, even the synchronization information is not transmitted to the one of the specified user apparatuses. Therefore, theoretically, there is no possibility that the synchronization information is stolen between the server apparatus and the one of the user apparatuses.

The server apparatus may be configured to transmit, as the synchronization information, information derived by performing a reversible operation on both a solution used as the initial solution that is capable of being generated by the user solution generation means in one of the specified user apparatuses and a solution used as the initial solution that is capable of being generated by the user solution generation means in the other of the specified user apparatuses to any of the user apparatuses as the specified user apparatuses. In this case, the user apparatuses of the specified user apparatuses that does not receive the synchronization information may be configured to designates a new solution generated by the user solution generation means under a predetermined condition as an initial solution, and the user apparatus of the specified user apparatuses that receives the synchronization information transmitted from the server apparatus may be configured to perform a reverse operation that is reverse to the reversible operation on the synchronization information transmitted from the server apparatus using a new solution generated by the user solution generation means to derive from the synchronization information a solution that is common to the solution generated in the user apparatus that does not receive the synchronization information and designate the derived solution as an initial solution, thereby allowing synchronization of the solutions between the user apparatuses.

In this case, the server apparatus transmits the synchronization information to any of the user apparatuses as the specified user apparatuses. The synchronization information is obtained by performing a reversible operation on the two solutions that can be generated by the user solution generation means in the two user apparatuses as the specified user apparatuses. Typically, the synchronization information may be the product of the two solutions or the exclusive-OR of the two solutions. As described above, the server solution generation means in the server apparatus can generate solutions synchronized with the solutions generated by the user solution generation means in all the user apparatuses. Therefore, the server apparatus can grasp the solutions that can be generated by the user solution generation means in both the two user apparatuses as the specified user apparatuses. Therefore, the server apparatus can obtain the synchronization information described above by performing the reversible operation on the grasped two solutions as described above. The synchronization information is transmitted to any of the two user apparatuses as the specified user apparatuses.

The user apparatus having received the synchronization information uses the new solution generated by the user solution generation means thereof to perform a reverse operation that is reverse to the reversible operation described above on the synchronization information. For example, if the reversible operation performed in the server apparatus to obtain the synchronization information is a multiplication, the user apparatus performs a division of the synchronization information by the solution generated by the user solution generation means thereof. In this way, the user apparatus having received the synchronization information can obtain a solution that can be generated only by the user solution generation means in the user apparatus that does not receive the synchronization information, which would otherwise be obtained by the user apparatus. In other words, the user apparatus having received the synchronization information can extract, from the synchronization information, a solution that can be generated by only the user solution generation means in the user apparatus that does not receive the synchronization information. The user apparatus having received the synchronization information designates the solution as an initial solution. On the other hand, the user apparatus that does not receive the synchronization information designates the solution generated by the user solution generation means thereof as an initial solution. The initial solution can be the same as the solution designated by the initial solution by the user apparatus having received the synchronization information.

In this case, the condition under which the user solution generation means in the user apparatus that does not receive the synchronization information generates the solution and the condition under which the server solution generation means in the server apparatus generates the solution used for generating the synchronization information need to agree with each other. The condition may be shared between the user apparatus and the server apparatus in advance or through information transmitted from the server apparatus to the user apparatus. Details of the condition are the same as those described above.

In this case also, the synchronization information as the solution transmitted from the server apparatus to any of the specified user apparatus is not used as an initial solution for the encrypted communication between the specified user apparatuses but is used only for generating the initial solution. Therefore, even if the synchronization information is stolen by a third party, the third party cannot tap the encrypted communication between the specified user apparatuses using the synchronization information. In addition, in this case, even the synchronization information is not transmitted to one of the specified user apparatuses. Therefore, theoretically, there is no possibility that the synchronization information is stolen between the server apparatus and the one of the user apparatuses.

The server apparatus may be configured to transmit first information derived by performing a reversible operation on both a solution used as the initial solution and a solution that is capable of being generated by the user solution generation means in one of the specified user apparatuses as the synchronization information to the one of the user apparatuses, and transmit second information derived by performing a reversible operation on both the solution used as the initial solution and a solution that is capable of being generated by the user solution generation means in the other of the specified user apparatuses as the synchronization information to the other of the specified user apparatuses. In this case, the one of the specified user apparatuses may be configured to perform a reverse operation that is reverse to the reversible operation on the synchronization information transmitted from the server apparatus using a new solution generated by the user solution generation means to derive a solution from the synchronization information, which is the first information, and designate the derived solution as an initial solution, and the other of the specified user apparatuses may be configured to perform a reverse operation that is reverse to the reversible operation on the synchronization information transmitted from the server apparatus using a new solution generated by the user solution generation means to derive a solution that is common to the solution derived in the one of the specified user apparatuses from the synchronization information, which is the second information, and designate the derived solution as an initial solution, thereby allowing synchronization of the solutions between the specified user apparatuses.

In this case, the server apparatus transmits the synchronization information to both the two user apparatuses as the specified user apparatuses. In this case, different pieces of synchronization information are transmitted to the two user apparatuses. The synchronization information transmitted to one of the two user apparatuses as the specified user apparatuses is first information derived by performing a reversible operation on both a solution used as the initial solution and a solution that can be generated by the user solution generation means in the one of the specified user apparatuses. The synchronization information transmitted to the other of the two user apparatuses as the specified user apparatuses is second information derived by performing a reversible operation on both the solution used as the initial solution and a solution that can be generated by the user solution generation means in the other of the specified user apparatuses. Examples of the reversible operation have already been described above. As described above, since the server solution generation means in the server apparatus can generate solutions synchronized with the solutions generated by the user solution generation means in all the user apparatuses, the server solution generation means can generate the solutions generated by the user solution generation means in both the two user apparatuses as the specified user apparatuses. By performing the reversible operation on these two solutions and the same solution to be used as an initial solution by the specified user apparatuses later, the server apparatus can generate the first information and the second information. The solution that is to be used as an initial solution by the specified user apparatuses later may or may not be generated by the server solution generation means. The first information as the synchronization information is transmitted to the one of the two user apparatuses as the specified user apparatuses, and the second information as the synchronization information is transmitted to the other of the two user apparatuses as the specified user apparatuses.

The one of the user apparatuses as the specified user apparatuses having received the first information as the synchronization information uses the solution generated by the user solution generation means thereof to perform a reverse operation that is reverse to the reversible operation described above on the synchronization information. Then, the one user apparatus can obtain the solution prepared by the server apparatus, which would otherwise be available to the user apparatus. In other words, the one user apparatus having received the synchronization information can extract the solution to be used as an initial solution from the synchronization information. The one user apparatus designates the solution as an initial solution. On the other hand, the other of the user apparatuses as the specified user apparatus having received the second information as the synchronization information uses the solution generated by the user solution generation means thereof to perform a reverse operation that is reverse to the reversible operation described above on the synchronization information. Then, the other user apparatuses can obtain the solution prepared by the server apparatus, which would otherwise be available to the user apparatus. In other words, the other user apparatus having received the synchronization information can extract the solution to be used as an initial solution from the synchronization information. The other user apparatus designates the solution as an initial solution. This initial solution agrees with the initial solution in the one user apparatus.

In this case, the condition under which the user solution generation means in the one user apparatus generates the solution and the condition under which the server solution generation means in the server apparatus generates the solution that can be generated by the user solution generation means in the user apparatus that is used when generating the synchronization information to be transmitted to the user apparatus need to agree with each other. Similarly, the condition under which the user solution generation means in the other user apparatus generates the solution and the condition under which the server solution generation means in the server apparatus generates the solution that can be generated by the user solution generation means in the user apparatus that is used when generating the synchronization information to be transmitted to the user apparatus need to agree with each other. The condition may be shared between the relevant user apparatus and the server apparatus in advance or through information transmitted from the server apparatus to the user apparatus. Details of the condition are the same as those described above.

In this case also, the synchronization information as the solution transmitted from the server apparatus to any of the specified user apparatus is not used as an initial solution for the encrypted communication between the specified user apparatuses but is used only for generating the initial solution. Therefore, even if the synchronization information is stolen by a third party, the third party cannot tap the encrypted communication between the specified user apparatuses using the synchronization information.

The server apparatus may be formed by one apparatus or may include a plurality of sub-server apparatuses each of which is capable of connecting to the network.

For example, the server apparatus may include a plurality of sub-server apparatuses that are configured to be capable of generating an initial solution synchronized between at least a plurality of the user apparatuses and performing encrypted communication with each other via the network. In this case, if the specified user apparatuses are configured to generate an initial solution synchronized with solutions generated by each of two sub-server apparatuses, the two sub-server apparatuses and or a combination of the two sub-server apparatuses and another sub-server apparatus capable of encrypted communication with both the two sub-server apparatuses may cooperate with each other to provide the synchronization information generation means and the server transmission means.

For example, it is supposed that there are a hundred user apparatuses, which are numbered 1 through 100. In this situation, it is also supposed that there are two server apparatuses, which are referred to as sub-server apparatuses 1 and 2. Furthermore, it is supposed that the sub-server apparatus 1 and the user apparatuses 1 to 50 can generate synchronized solution, and the sub-server apparatus 2 and the user apparatuses 51 to 100 can generate synchronized solutions. In such a situation, one server apparatus, that is, the sub-server apparatus 1 capable of generating solutions synchronized with solutions generated by the user apparatuses 1 to 50, supplies the synchronization information to the user apparatuses 1 to 50 as described above, and this allows any two user apparatuses among the user apparatuses 1 to 50 to share a common initial solution, generate synchronized solutions, and perform the encrypted communication using synchronized solutions described above. On the other hand, the sub-server apparatus 2 capable of generating solutions synchronized with solutions generated by the user apparatuses 51 to 100 supplies the synchronization information to the user apparatuses 51 to 100, and this allows any two user apparatuses among the user apparatuses 51 to 100 to share a common initial solution, generate synchronized solutions, and perform the encrypted communication using synchronized solutions described above.

However, if the sub-server apparatuses 1 and 2 do not communicate with each other or do not cooperate to provide synchronization information to user apparatuses, any one of the user apparatuses 1 to 50 and any one of the user apparatuses 51 to 100 cannot share a common initial solution, generate synchronized solutions, and perform the encrypted communication using synchronized solutions described above. In other words, the user apparatuses 1 to 50 linked to or managed by the sub-server apparatus 1 and the user apparatuses 51 to 100 linked to or managed by the sub-server apparatus 2 belong to different groups, and user apparatuses in the different groups cannot share a common initial solution and therefore cannot perform the encrypted communication using synchronized solutions described above.

However, if a plurality of sub-server apparatuses forming the server apparatus can perform encrypted communication with each other via the network, two user apparatuses (which will be referred to as specified user apparatuses) that belong to different groups and cannot receive synchronization information from a common sub-server apparatus can receive supply of synchronization information from a sub-server apparatus that can generate solutions synchronized with solutions generated by the two user apparatuses as required (as described above, the synchronization information may not be supplied to one of the specified user apparatuses in some cases). That is, a plurality of sub-server apparatuses each of which can serve as the server apparatus described above in its group can cooperate with each other, and the plurality of cooperating sub-server apparatus can serve as a new server apparatus for a larger number of user apparatuses including the different groups of user apparatuses managed by the plurality of cooperating sub-server apparatuses. As a result, user apparatuses belonging to different groups can perform the encrypted communication using synchronized solutions described above.

In this case, any of the plurality of sub-server apparatuses can generate the synchronization information. Information that is required for a sub-server apparatus to generate synchronization information but is not available to the sub-server apparatus if the sub-server apparatus does not cooperate with another sub-server apparatus, such as information about a solution generated by a certain user apparatus belonging to a group different from the group to which the sub-server apparatus belongs, can be encrypted and provided from the sub-server apparatus of the group to which the certain user apparatus belongs to the sub-server apparatus generating the synchronization information via the network. Furthermore, if synchronization information generated by a sub-server apparatus needs to be provided to a user apparatus that belongs to a group to which the sub-server apparatus does not belong, the sub-server apparatus having generated the synchronization information can transmit the generated synchronization information to the sub-server apparatus that manages the group to which the destination user apparatus belongs, thereby transmitting the synchronization information to the destination user apparatuses via the sub-server apparatus.

In a possible practical implementation, for example, each provider can provide a sub-server apparatus that manages the user apparatuses that has contracted with the provider, and the sub-server apparatus provided by each provider can cooperate with the sub-server apparatuses provided by the other providers. Of course, in another possible implementation, each sub-server apparatus is not provided by a provider, and an organization such as a certification authority in a secure sockets layer (SSL) or transport layer security (TSL) system can provide each sub-server apparatus.

In the example described above, when two user apparatuses belonging to different groups are to communicate with each other, two cooperating sub-server apparatuses that belong to the groups to which the respective user apparatuses belong provide synchronization information to the user apparatuses, and the two sub-server apparatuses cooperate by themselves to directly exchange required information therebetween. However, the two sub-server apparatuses in this case do not always have to directly exchange required information between themselves and may exchange required information via an additional sub-server apparatus. In this case, although the additional sub-server apparatus needs to be capable of encrypted communication with each of the two sub-server apparatuses described above, the two sub-server apparatuses do not have to be capable of encrypted communication therebetween. For example, in the example described above, it is supposed that each of sub-server apparatuses provided by two providers manages a plurality of user apparatuses and forms a different group. In this situation, it is further supposed that the sub-server apparatuses provided by the two providers do not cooperate with each other as described above because the two providers are based on different countries, for example. In this situation, if there is an additional sub-server apparatus that can cooperate with each of the two sub-server apparatuses or, in other words, has already built a relationship of trust with each of the two sub-server apparatuses, the sub-server apparatuses that are not in cooperation with each other can perform encrypted communication with the additional sub-server apparatus interposed therebetween. If the communication is encrypted along the entire path, the information exchanged by the communication, such as the information required to generate the synchronization information and the generated synchronization information, would not be tapped by a third party. In such a situation, the additional sub-server apparatus described above does not always have to manage user apparatuses to form a group such as that described above, and may simply intervene between the two sub-server apparatuses that manage their respective user apparatuses to form different groups. In this respect, the additional sub-server apparatus differs from the two sub-server apparatuses that are directly linked to user apparatuses. In other words, the additional sub-server apparatus in this case is an entity like a higher level certification authority in the SSL or TLS system. If there is "an additional sub-server apparatus" serving as a higher level certification authority among three or more sub-server apparatuses, the "additional sub-server apparatus" may generate synchronization information. There may be a plurality of additional sub-server apparatuses, and a plurality of additional sub-server apparatuses may intervene between the two sub-server apparatuses described above. For example, if there are three additional sub-server apparatuses intervening between the two sub-server apparatuses, one of the two sub-server apparatuses is connected to one of the additional sub-server apparatuses, which is connected to another of the additional sub-server apparatuses, which is connected to the remaining one of the additional sub-server apparatuses, which is connected to the other of the two sub-server apparatuses. These connections are encrypted communication between the relevant sub-server apparatuses.

The encrypted communication between the sub-server apparatuses may be known or well-known encrypted communication, or may be the encrypted communication using synchronized solutions repeatedly described in this specification. In the latter case, the sub-server apparatuses performing encrypted communication need to have means or function of generating synchronized solutions.

As an aspect of the present invention, the inventor also proposes a method performed in the server apparatus forming the communication system described above. The method has the same advantages as the communication system described above.

For example, the method is a method performed in a server apparatus that forms a communication system in cooperation with a large number of user apparatuses, the communication system comprising the large number of user apparatuses and the server apparatus, the user apparatuses being capable of communicating with each other via a network, and the server apparatus being connected to the network and controlling communication between the user apparatuses.

In this example, each of the user apparatuses has: user solution generation means capable of successively generating solutions based on an initial solution, the generated solution being a string of a predetermined number of characters of at least one type selected from among letters, numerals and symbols, and a same solution being always generated under a same condition; user encryption means that performs a processing of encrypting transmission data, which is to be transmitted, into encrypted data using the solution generated by the user solution generation means; user transmission means that transmits the encrypted data to another apparatus; user reception means that receives the encrypted data from another apparatus; and user decryption means that performs a processing of decrypting the received encrypted data using the solution generated by the user solution generation means into the transmission data. Furthermore, each of the user apparatuses is configured so that, if specified user apparatuses, which are two user apparatuses that are to perform encrypted communication, have a common initial solution, the specified user apparatuses are capable of encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses. Furthermore, each of the user apparatuses is configured to be capable of transmitting specification information, which is information that specifies both the specified user apparatuses, to the server apparatus from the user transmission means thereof.

The method according to the present invention includes steps performed by the server apparatus that comprises server solution generation means capable of generating solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses, and the steps include: a step of receiving the specification information from one of the specified user apparatuses; a step of generating synchronization information, which is information required for the specified user apparatuses that obtain the same initial solution to synchronize the solutions between the specified user apparatuses, using the solution generated by the server solution generation means; and a step of transmitting the synchronization information to at least one of the specified user apparatuses.

As an aspect of the present invention, the inventor also proposes a method performed in the user apparatus forming the communication system described above. The method has the same advantages as the communication system described above.

For example, the method is a method performed by one of the user apparatuses described above, including: a step of the user transmission means transmitting specification information, which is information that specifies both the specified user apparatuses, to the server apparatus; and a step of generating the initial solution using the specification information when receiving the synchronization information, the steps being performed by the user apparatus.

As an aspect of the present invention, the inventor also proposes a computer program that makes a general-purpose computer, for example, function as the server apparatus forming the communication system described above. The computer program has the same advantages as the communication system described above.

For example, the computer program is a computer program that makes a computer function as a server apparatus that forms a communication system in cooperation with a large number of user apparatuses, the communication system including the large number of user apparatuses and the server apparatus, the user apparatuses being capable of communicating with each other via a network, and the server apparatus being connected to the network and controlling communication between the user apparatuses.

Each of the user apparatuses has: user solution generation means capable of successively generating solutions based on an initial solution, the generated solution being a string of a predetermined number of characters of at least one type selected from among letters, numerals and symbols, and a same solution being always generated under a same condition; user encryption means that performs a processing of encrypting transmission data, which is to be transmitted, into encrypted data using the solution generated by the user solution generation means; user transmission means that transmits the encrypted data to another apparatus; user reception means that receives the encrypted data from another apparatus; and user decryption means that performs a processing of decrypting the received encrypted data using the solution generated by the user solution generation means into the transmission data. Each of the user apparatuses is configured so that, if specified user apparatuses, which are two user apparatuses that are to perform encrypted communication, have a common initial solution, the specified user apparatuses are capable of encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses. Furthermore, each of the user apparatuses is configured to be capable of transmitting specification information, which is information that specifies both the specified user apparatuses, to the server apparatus from the user transmission means thereof.

The computer program makes the computer function as: server reception means that receives the specification information from one of the specified user apparatuses; server solution generation means capable of generating solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses; synchronization information generation means that generates synchronization information, which is information required for the specified user apparatuses that obtain the same initial solution to synchronize the solutions between the specified user apparatuses, using the solution generated by the server solution generation means; and server transmission means that transmits the synchronization information to at least one of the specified user apparatuses.

As an aspect of the present invention, the inventor also provides a computer program that makes a general-purpose computer, for example, function as the user apparatus forming the communication system described above. The computer program has the same advantages as the communication system described above.

For example, the computer program is a computer program that makes a computer function as a user apparatus that forms the communication system in corporation with one of the server apparatuses described above.

The computer program makes the computer function as: user solution generation means capable of successively generating solutions based on an initial solution, the generated solution being a string of a predetermined number of characters of at least one type selected from among letters, numerals and symbols, and a same solution being always generated under a same condition; user encryption means that performs a processing of encrypting transmission data, which is to be transmitted, into encrypted data using the solution generated by the user solution generation means; user transmission means that transmits the encrypted data to another apparatus; user reception means that receives the encrypted data from another apparatus; user decryption means that performs a processing of decrypting the received encrypted data using the solution generated by the user solution generation means into the transmission data; and means that generate the initial solution using the specification information when receiving the synchronization information from the server apparatus.

If specified user apparatuses, which are two user apparatuses that are to perform encrypted communication, have a common initial solution, the computer program allows the user solution generation means in each of the two user apparatuses to generate a common solution synchronized between the specified user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses, thereby allowing the specified user apparatuses to perform encrypted communication therebetween.

DESCRIPTION OF EMBODIMENTS

Figure 1:
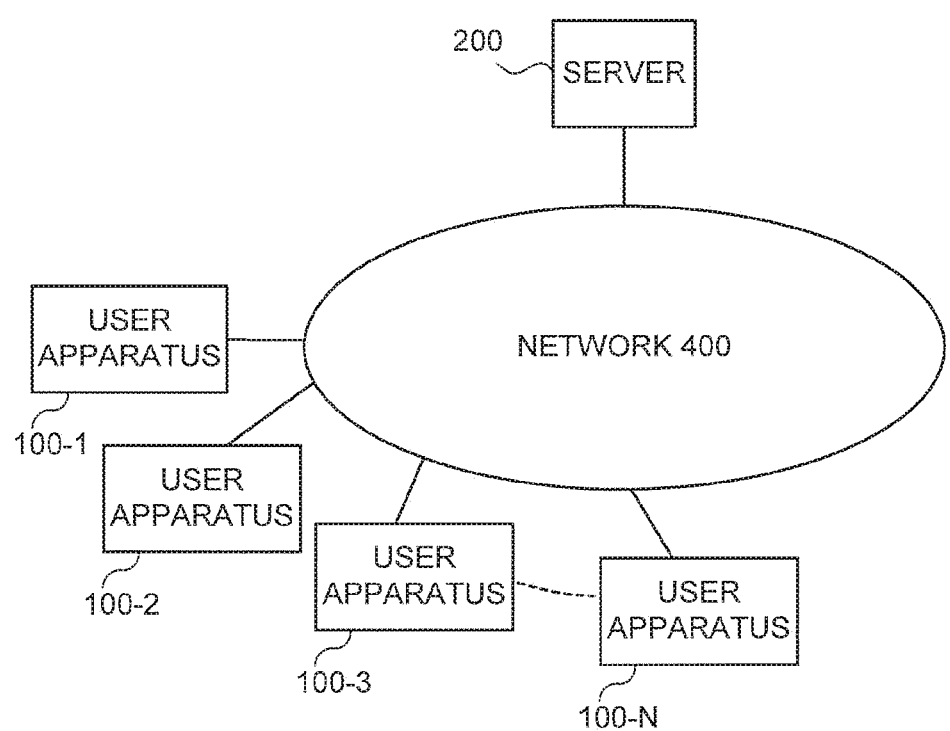
FIG. 1 is a diagram showing a general configuration of a communication system according to a first embodiment.

In the following, first and second preferred embodiments of the present invention will be described.

In the description of the embodiments and modifications thereof, like components are denoted by like reference numerals, and redundant descriptions thereof may be omitted. Furthermore, two or more of the embodiments and modifications may be combined as required, or some features in some embodiments or modifications may be replaced with features in other embodiments or modifications as required, as far as the combinations or replacements pose no contradiction.

First Embodiment

FIG. 1 is a schematic diagram showing a general configuration of a communication system, which is a transmission/reception system according to a first embodiment of the present invention.

The communication system according to the first embodiment includes a large number of user apparatuses 100-1 to 100-N (sometimes referred to simply as a "user apparatus 100", hereinafter) and a server 200. All of these are capable of connecting to a network 400.

The network 400 is the Internet in this embodiment, although not limited thereto.

The user apparatus 100 in this embodiment corresponds to a "user apparatus" in this specification. The server 200 in this embodiment corresponds to a "server apparatus" in this specification.

It is supposed that communication occurs between two of the user apparatuses 100-1 to 100-N. Users own their respective user apparatuses 100-1 to 100-N. Although the communication is encrypted communication using successively generated solutions as described later, of course, the user apparatuses 100-1 to 100-N may also be adapted to perform other communications than such encrypted communication. Those other communications can be based on any known or well-known techniques. The user apparatus 100 may be a computer that allows viewing of a webpage on another user apparatus 100 via the network 400.

In this embodiment, there is a single server 200, and the single server 200 manages all the user apparatuses 100. In other words. FIG. 1 shows only the user apparatuses 100 managed by the single server 200 in this embodiment.

Without limitation, the server 200 in this embodiment may be an enterprise that is public to some extent, such as an enterprise that is credible enough to be a certification authority in SSL or TSL, or an entity managed by a public organization. Alternatively, the server 200 may be managed by a provider that provides connection of the user apparatus 100 to the network 400.

The user apparatus 100 contains a computer. More specifically, the user apparatus 100 in this embodiment is a general-purpose computer.

Next, a configuration of the user apparatus 100 will be described. The user apparatuses 100-1 to 100-N have the same configuration in the context of the present invention.

The user apparatus 100 may be a cellular phone, a smart phone, a tablet, a notebook computer, or a desktop computer, for example. The user apparatus 100 can be any apparatus that is capable of communication via the network 400 and can have the functional blocks described later and perform the processings described later once the computer program described later is installed in the apparatus.

For example, if the user apparatus 100 is a smart phone or a tablet, the smart phone serving as the user apparatus 100 may be an iPhone manufactured and marketed by Apple Japan Inc., and the tablet serving as the user apparatus 100 may be an iPad manufactured and marketed by Apple Japan Inc. Without limitation, the following description will be made on the assumption that the user apparatus 100 is a smart phone.

Figure 2:
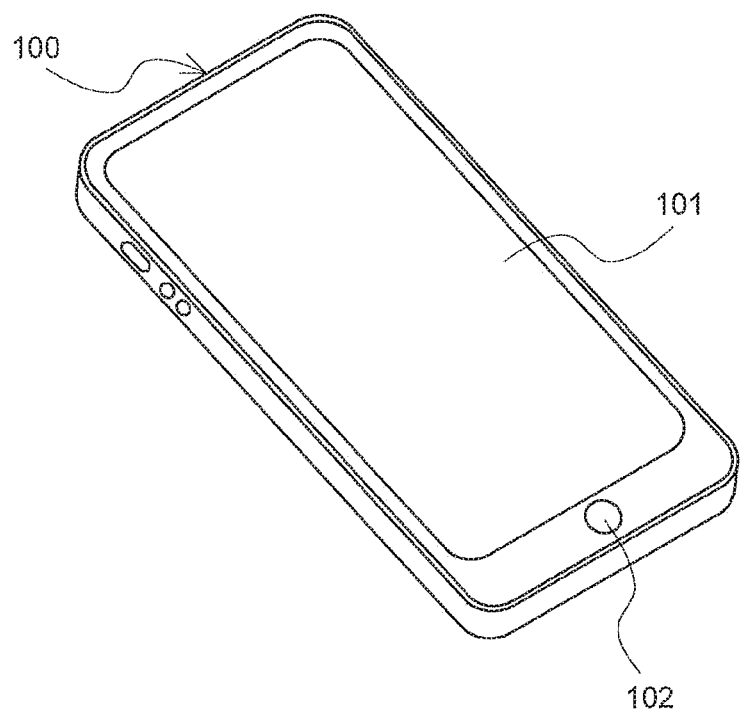
FIG. 2 shows an appearance of a user apparatus included in the communication system shown in FIG. 1.

FIG. 2 shows an example of the appearance of the user apparatus 100.

The user apparatus 100 includes a display 101. The display 101 is to display a still or moving picture and may be any known or well-known display. The display 101 is a liquid crystal display, for example. The user apparatus 100 includes an input device 102. The input device 102 is to allow a user to perform a desired input to the user apparatus 100. The input device 102 may be any known or well-known device. Although the input device 102 of the user apparatus 100 in this embodiment is shown as a button type, the input device 102 is not limited thereto and may be a numeric keypad, a keyboard, a track ball or a mouse, for example. In particular, if the user apparatus 100 is a notebook computer or a desktop computer, the input device 102 would be a keyboard or a mouse, for example. If the display 101 is a touch panel, the display 101 serves also as the input device 102. The latter holds for this embodiment.

Figure 3:
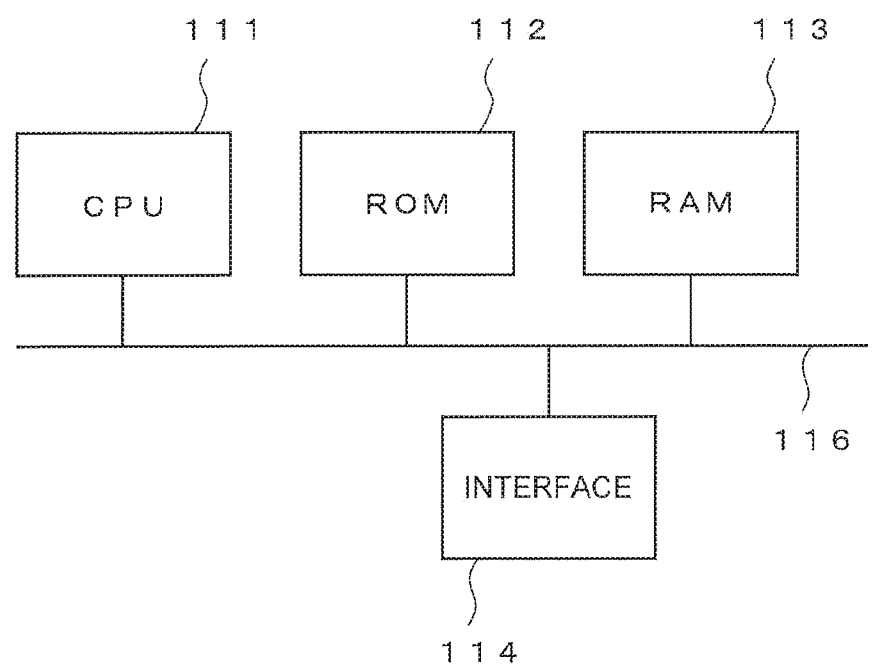
FIG. 3 shows a hardware configuration of the user apparatus included in the communication system shown in FIG. 1.

FIG. 3 shows a hardware configuration of the user apparatus 100.

The hardware includes a central processing unit (CPU) 111, a read only memory (ROM) 112, a random access memory (RAM) 113, and an interface 114, which are interconnected by a bus 116.

The CPU 111 is an arithmetic unit that performs operations. The CPU 111 performs the processings described later by executing a computer program stored in the ROM 112 or the RAM 113. Although not shown, the user apparatus 100 may include a mass storage such as a hard disk drive (HDD), and the computer program may be stored in the mass storage.

The computer program referred to herein includes at least a computer program that makes the user apparatus function as the "user apparatus" according to the present invention. The computer program may be pre-installed in the user apparatus 100 or installed after shipping. The computer program may be installed in the user apparatus 100 via a predetermined recording medium such as a memory card or via a network such as a LAN or the Internet.

The ROM 112 stores a computer program or data required for the CPU 111 to perform the processings described later. The ROM 112 may further store other computer programs.

If the user apparatus 100 is a smart phone, a computer program or data required to make the user apparatus function as a smart phone, such as a computer program or data required for telephone calls or e-mails, is also stored in the ROM 112. The user apparatus 100 also allows viewing of a webpage based on data received via the network 400 and includes a known web browser that enables the viewing.

The RAM 113 provides a working area required for the CPU 111 to perform the processings. In some cases, the RAM 113 may store the computer program or data described above.

The interface 114 allows data exchange between the CPU 111, the RAM 113 or the like interconnected by the bus 116 and the outside. The display 101 and input device 102 described above are connected to the interface 114. Inputs on the input device 102 are transferred to the bus 116 via the interface 114. As well-known, image data for displaying an image on the display 101 is output on the display 101 via the interface 114.

The interface 114 is also connected to a transmission/reception mechanism (not shown), which is known means for external communication via the network 400, which is the internet. This allows the user apparatus 100 to transmit and receive data via the network 400. The data transmission and reception via the network 400 may be wired or wireless. For example, if the user apparatus 100 is a smart phone, the communication would typically be wireless. The transmission/reception mechanism may be configured in a known or well-known manner as far as possible. Data the transmission/reception mechanism receives from the network 400 is received by the interface 114, and data passed to the transmission/reception mechanism from the interface 114 is transmitted to the outside, such as another user apparatus 100 or the server 200, via the network 400. The data the transmission/reception mechanism receives from the network 400 includes at least synchronization information transmitted from the server 200 and encrypted data transmitted from another user apparatus 100. The data the transmission/reception mechanism transmits to the outside includes at least specification information to be transmitted to the server 200 and encrypted data to be transmitted to another user apparatus 100.

Figure 4:
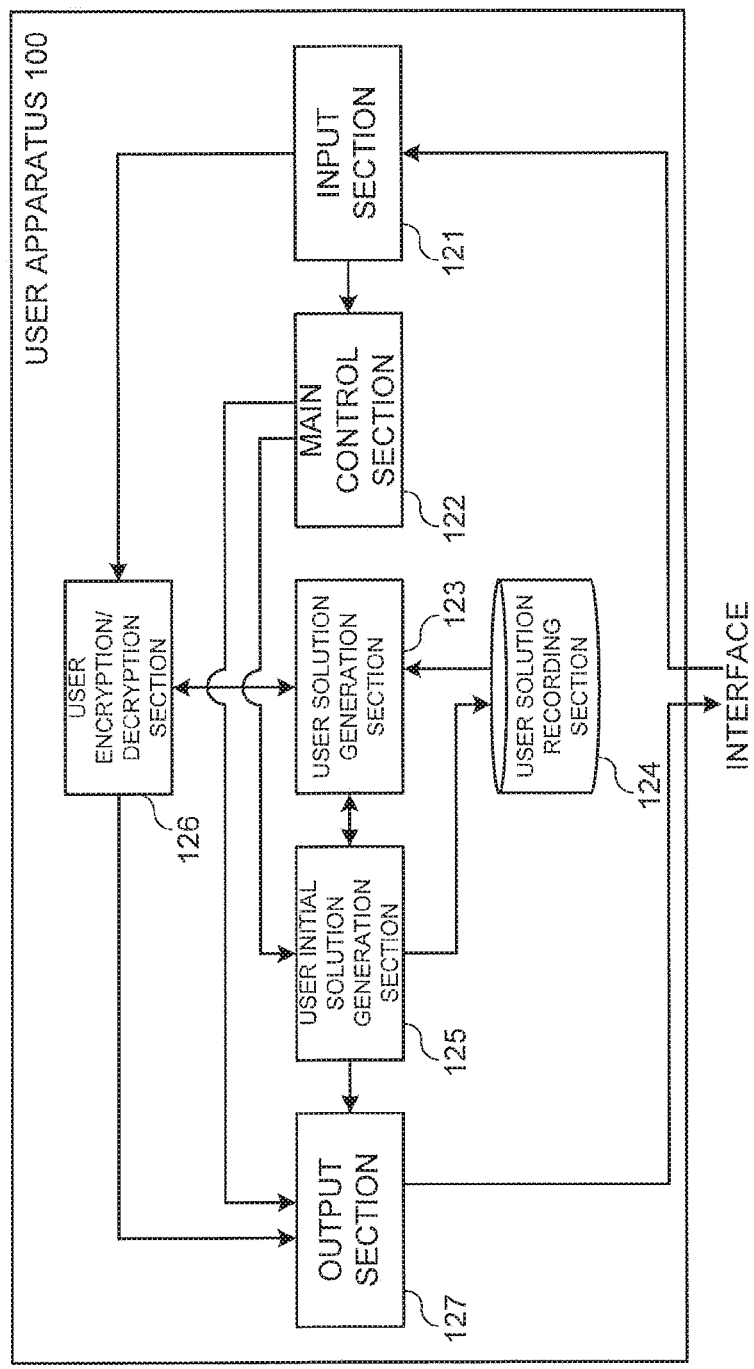
FIG. 4 is a block diagram showing functional blocks produced in a user apparatus included in the communication system shown in FIG. 1.

Once the CPU 111 executes the computer program, the functional blocks shown in FIG. 4 are produced in the user apparatus 100. Although the functional blocks described below may be produced by the above-described computer program alone that makes the user apparatus 100 function as the "user apparatus" according to the present invention or may be produced by cooperation of the above-described computer program and an operating system or other computer program installed in the user apparatus 100.

In the context of the present invention, an input section 121, a main control section 122, a user solution generation section 123, a user solution recording section 124, a user initial solution generation section 125, a user encryption/decryption section 126, and an output section 127 are produced in the user apparatus 100. The functions of the input section 121, the main control section 122, the user solution generation section 123, the user solution recording section 124, the user initial solution generation section 125, the user encryption/decryption section 126, and the output section 127 may be on a SIM card incorporated in the user apparatus 100. In that case, those functions do not always need to be produced by the computer program installed in the user apparatus 100.

The input section 121 is to receive an input from the interface 114.

The input from the interface 114 may be specification information input on the input device 102, for example. The specification information is to specify two user apparatuses 100 ("specified user apparatuses" according to the present invention) that are to perform encrypted communication. The specification information about the user apparatus 100 that is to start the communication at least needs to be unique. For example, the specification information includes an IP address, an e-mail address, an URL, or a social networking service (SNS) ID of the user apparatus 100. The same holds true for the user apparatus 100 that receives the communication. In this embodiment, without limitation, both the two user apparatuses 100 as the "specified user apparatuses" are specified by the IP address. In this embodiment, without limitation, when the user operates the input device 102 to input information that specifies the other user apparatus 100 with which the user is to establish the encrypted communication, specification information that specifies both the IP address of the user apparatus 100 and the IP address of the other user apparatus 100 is automatically generated. Alternatively, the specification information may be generated by the user inputting on the input device 102 both the IP addresses of the two user apparatuses 100 that are to perform the encrypted communication.

The user may generate transmission data by operating the input device 102. The transmission data is data that is to be encrypted and transmitted and received between the user apparatuses 100. For example, if an e-mail is transmitted and received, the transmission data is data of the e-mail. If one of the user apparatuses 100 provides a webpage of a virtual shop on the Internet, and the other user apparatus 100 is a user apparatus of a customer who is to make a purchase on the virtual shop, the data transmitted from the user apparatus 100 on the side of the virtual shop to the customer is data that provides an item selection screen or a format for entry of customer information or destination information to the user apparatus 100 of the customer, and the data transmitted from the user apparatus 100 of the customer to the user apparatus 100 of the virtual shop includes information that specifies the names and quantity of the items selected for purchase by the user or the customer or destination information entered in the above-described format by the user, for example. The transmission data may be data of any form, such as text data, image data or an audio data. The transmission data does not need to be data itself that is input by the user on the input device 102 and may be data produced by the user apparatus 100 through a predetermined process. Rather, the latter case is more common.

The synchronization information and encrypted data transmitted from the transmission/reception mechanism to the interface 114 described above may also be input to the input section 121 from the interface 114.

As described above, the specification information and the transmission data from the input device 102 and the synchronization information and the encrypted data from the transmission/reception mechanism are input to the input section 121.

When the input section 121 receives the specification information and the synchronization information, the input section 121 transmits the specification information and the synchronization information to the main control section 122. When the input section 121 receives the transmission data and the encrypted data, the input section 121 transmits the transmission data and the encrypted data to the user encryption/decryption section 126.

The main control section 122 is to control the whole of the functional blocks produced in the user apparatus 100.

The main control section 122 may receive the specification information from the input section 121. When the main control section 122 receives the specification information, the main control section 122 transmits the specification information to the output section 127.

The main control section 122 may receive the synchronization information. When the main control section 122 receives the synchronization information, the main control section 122 transmits the synchronization information to the user initial solution generation section 125.

The user solution generation section 123 is to generate a solution. The manner in which the solution is generated will be described later. In this embodiment, the solution is a sequence of a predetermined number of characters of at least one type selected from among letters, numerals and symbols. The solution is based on an initial solution, and the same solution is always generated under the same conditions. A typical solution is a pseudo-random number. All the solutions generated in this embodiment have the same number of digits or include the same number of characters.

The user solution generation section 123 primarily generates a solution when the user encryption/decryption section 126 performs the encryption processing or decryption processing described later. The expression "when the user encryption/decryption section 126 performs the encryption processing or decryption processing" means when the user apparatus 100 performs encrypted communication with the other user apparatus 100, as described in detail later. The user solution generation section 123 transmits a solution generated for the encrypted communication between the user apparatuses 100 to the user encryption/decryption section 126.

The user solution generation section 123 in the user apparatus 100 may also generate a solution when the synchronization information is transmitted to the user initial solution generation section 125. The solution generated in this situation is intended for generation of an initial solution used in the encrypted communication. The solution intended for generation of the initial solution used in the encrypted communication is transmitted from the user solution generation section 123 to the user initial solution generation section 125.

The user solution recording section 124 stores information required for the user solution generation section 123 to generate a solution. The information typically includes data on a true initial solution and data on an initial solution. Both the data on the true initial solution and the data on the initial solution affect the solutions subsequently generated. The data on the true initial solution and the data on the initial solution are of the same format as the data on the subsequent solutions, that is, sequences of a predetermined number of characters of at least one type selected from among letters, numerals and symbols, which may or may not have the same number of digits or include the same number of characters as the subsequent solutions. In this embodiment, without limitation, the data on the true initial solution and the data on the initial solution are of the same type as the data on the subsequent solutions, and the true initial solution and the initial solution have the same number of digits or include the same number of characters as the subsequent solutions.

When generating a solution, the user solution generation section 123 reads required data from the user solution recording section 124 and uses the read data.

When the user apparatus 100 and the server 200 are required to generate a solution in synchronization, the user solution generation section 123 reads the true initial solution or a solution described later to achieve this. When generating at least the first solution, the user solution generation section 123 uses the data on the true initial solution or other data stored in the user solution recording section 124. (Note that the true initial solution is an initial solution used for the user apparatus 100 and the server 200 to generate a solution in synchronization and is different from what is referred to as an "initial solution" in the present invention, which is used to generate solutions in synchronization by two user apparatuses 100 before starting encrypted communication between the user apparatuses 100.) That is, before the user solution generation section 123 generates at least the first solution, the data on the true initial solution is stored in the user solution recording section 124.

On the other hand, when the user apparatuses 100 generate a synchronized initial solution before starting encrypted communication using synchronized solutions between the user apparatuses 100, the user solution generation section 123 reads the data on the initial solution from the user solution recording section 124 and uses the data in principle.

The manner in which the user solution generation section 123 generates a solution will be described in detail later.

The user initial solution generation section 125 is to generate an initial solution required for two user apparatuses 100 as the specified user apparatuses to perform encrypted communication using synchronized solutions, using the synchronization information. The initial solution is generated by the two user apparatuses 100 in synchronization before starting encrypted communication using synchronized solutions between the user apparatuses 100 as described above.

As described above, the user initial solution generation section 125 may receive the synchronization information from the main control section 122. When the user initial solution generation section 125 receives the synchronization information, the user initial solution generation section 125 generates the initial solution based on the synchronization information. When generating the initial solution, the user initial solution generation section 125 may require a solution generated by the user solution generation section 123. Such a solution is in synchronization with the solution generated in the server 200. When the user initial solution generation section 125 requires such a solution, the user initial solution generation section 125 transmits an instruction to generate a solution to the user solution generation section 123.

When the user solution generation section 123 receives such an instruction, the user solution generation section 123 generates a solution and transmits the solution to the user initial solution generation section 125.

The user encryption/decryption section 126 is to perform at least one of encryption and decryption. In this embodiment, without limitation, the user encryption/decryption section 126 performs both encryption and decryption. The encryption and decryption are processings required for the encrypted communication between the user apparatuses 100.

The user encryption/decryption section 126 performs the encryption processing and the decryption processing only when the main control section 122 permits the user encryption/decryption section 126 to perform the encryption and the decryption.

The manner of encryption will be described in detail later. When performing the encryption, the user encryption/decryption section 126 transmits an instruction to generate a solution to the user solution generation section 123. In response to the instruction, the user solution generation section 123 generates a solution and transmits the solution to the user encryption/decryption section 126. The solution is used for the encryption by the user encryption/decryption section 126. Without limitation, the data encrypted in this embodiment is the transmission data generated based on the data input on the input device 102. The transmission data generated in the input device 102 is plaintext data, and the user encryption/decryption section 126 encrypts the data into encrypted data. The encrypted data generated by the user encryption/decryption section 126 is transmitted to the output section 127.

The manner of decryption will be described in detail later. When performing the decryption, the user encryption/decryption section 126 transmits an instruction to generate a solution to the user solution generation section 123. In response to the instruction, the user solution generation section 123 generates a solution and transmits the solution to the user encryption/decryption section 126. The solution is used for the decryption by the user encryption/decryption section 126. Without limitation, the data decrypted in this embodiment is the encrypted data transmitted from the other user apparatus 100. The encrypted data is generated by the user encryption/decryption section 126 in the user apparatus 100 that has transmitted the data, and the user encryption/decryption section 126 decrypts the data into the original transmission data. The decrypted plaintext data generated in the user encryption/decryption section 126 is transmitted to the output section 127.

The output section 127 is to output data generated in a functional block in the user apparatus 100 to the interface 114.

The output section 127 may receive the specification information transmitted from the main control section 122 as described above. The output section 127 outputs the specification information to the interface 114. The specification information is transmitted from the interface 114 to the transmission/reception mechanism, and then transmitted from the transmission/reception mechanism to the server 200 via the network 400.

The output section 127 may also receive the encrypted data transmitted from the user encryption/decryption section 126. When the output section 127 receives the encrypted data, the output section 127 outputs the encrypted data to the interface 114. The encrypted data is transmitted from the interface 114 to the transmission/reception mechanism, and then transmitted from the transmission/reception mechanism to the other user apparatus 100 on the other end of the encrypted communication via the network 400.

The output section 127 may also receive the plaintext transmission data transmitted from the user encryption/decryption section 126. The transmission data is generated in the other user apparatus 100. When the output section 127 receives the transmission data, the output section 127 outputs the transmission data to the interface 114. The transmission data is appropriately used in the user apparatus 100. For example, the transmission data is transmitted to the display 101, and the display 101 having received the transmission data provides a display in accordance with the transmission data.

Next, a configuration of the server 200 will be described.

As hardware, the server 200 may be an existing known or well-known server. The hardware configuration may also be a common configuration. Although not shown, in general, the server 200 may have a hardware configuration similar to that of the user apparatus 100, which includes the CPU 111, the ROM 112, the RAM 113 and the interface 114, which are interconnected by the bus 116. However, the server 200 would typically have an HDD or other mass storage, and the server 200 in this embodiment adopts the configuration.

The configuration and functions of the CPU, the ROM, the RAM, the interface, the bus and the mass storage of the server 200 are the same as those of the corresponding components of the user apparatus 100. To the interface of the server 200, a transmission/reception mechanism for communication with a device outside the server 200 via the network 400, which is similar to the transmission/reception mechanism of the user apparatus 100, is connected. Although a display or an input device similar to those of the user apparatus 100 may also be connected to the interface of the server 200, those components will not be further described here because they are hardly pertinent to the present invention.

The functional blocks described below are produced in the server 200 by executing a computer program stored in the ROM, the mass storage or the like in the server 200. Although the functional blocks described below may be produced by the computer program alone that makes the server 200 function as a "server" according to the present invention or may be produced by cooperation of the computer program and an operating system or other computer program installed in the server 200. The above-described computer program may be pre-installed in the server 200 or installed in the server 200 after shipping. In the latter case, the computer program may be installed in the server 200 via a predetermined recording medium such as a memory card or via a network such as a LAN or the Internet. In these respects, the server 200 is similar to the user apparatus 100.

Figure 5:
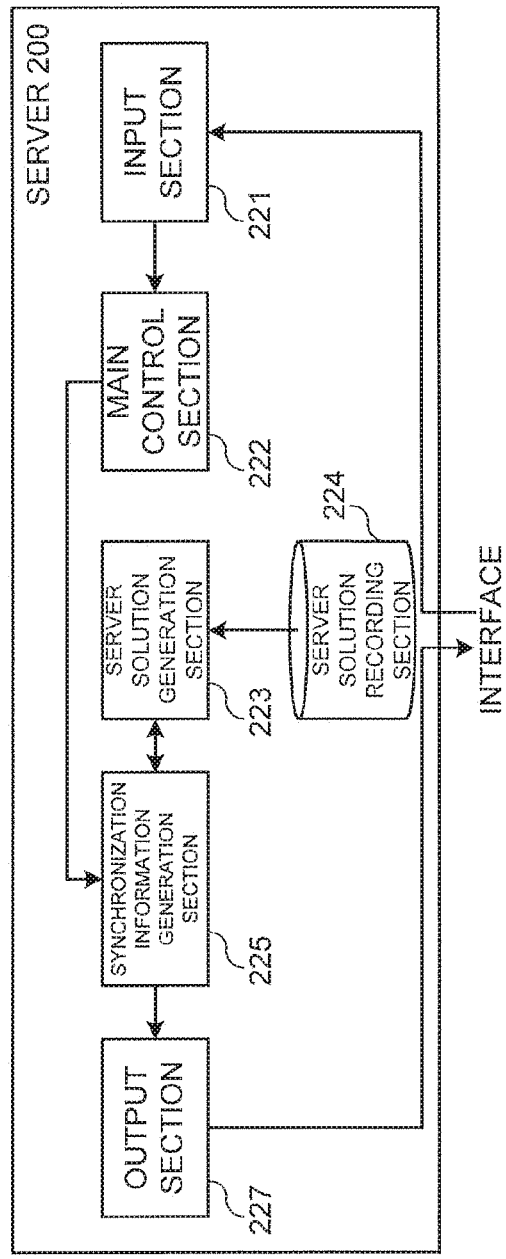
FIG. 5 is a block diagram showing functional blocks produced in a server included in the communication system shown in FIG. 1.

In the context of the present invention, an input section 221, a main control section 222, a server solution generation section 223, a server solution recording section 224, a synchronization information generation section 225, and an output section 227 are produced in the server 200 (FIG. 5).

The input section 221 is to receive an input from the interface.

The input from the interface may be specification information, for example. The specification information is transmitted from the user apparatus 100 via the network 400 and received by the server 200 at the transmission/reception mechanism thereof. When the input section 221 receives the specification information, the input section 221 transmits the specification information to the main control section 222.

The main control section 222 is to control the whole of the functional blocks produced in the server 200.

The main control section 222 may receive data of the specification information from the input section 221. When the main control section 222 receives the data of the specification information, the main control section 222 transmits the data to the synchronization information generation section 225.

The server solution generation section 223 is to generate a solution when the server solution generation section 223 receives an instruction to generate a solution. The server solution generation section 223 may receive the instruction to generate a solution from the synchronization information generation section 225 as described later, and is configured to generate a solution when the server solution generation section 223 receives such an instruction.

Although the manner in which the solution is generated will be described later, the server solution generation section 223 generates a solution in the same manner as the user solution generation section 123 in each user apparatus 100 does.

When generating a solution, the server solution generation section 223 reads required data from the server solution recording section 224 and uses the read data.

The server solution recording section 224 stores information required for the server solution generation section 223 to generate a solution. The information is primarily data on the true initial solution or data on a solution. The data on the true initial solution is the same as the data on the true initial solution stored in the user solution recording section 124 of each user apparatus 100. The true initial solution is used for generation of a solution. However, since the server 200 needs to generate solutions synchronized with all the user apparatuses 100 (the user apparatus 100-1 to 100-N), the server solution recording section 224 stores the same number of true initial solutions as the user apparatuses 100, N true initial solutions, at least when no solution has been generated. In addition, the server solution generation section 223 needs to grasp which true initial solution corresponds to the solution generated by which user apparatus 100, and therefore the true initial solutions are stored in the server solution recording section 224 in a state where each true initial solution is linked with information that specifies a user apparatus 100 in a one-to-one relationship. The information that specifies each user apparatus 100 is information unique to the user apparatus 100 that can be included in the specification information. In this embodiment, without limitation, the information is an IP address of the user apparatus 100.

When the user apparatus 100 and the server 200 are required to generate a solution in synchronization, the server solution generation section 223 in the server 200 reads the true initial solution or a solution described later to achieve this. When generating at least the first solution, the server solution generation section 223 uses the data on the true initial solution or other data stored in the server solution recording section 224.

The manner in which the server solution generation section 223 generates a solution will be described in detail later.

The server solution generation section 223 may receive an instruction to generate a solution from the synchronization information generation section 225 as described above. In such a case, the server solution generation section 223 receives the two IP addresses of the two specified user apparatuses, which are the information that specifies the user apparatuses, included in the specification information from the synchronization information generation section 225. If the server solution generation section 223 receives the two IP addresses from the synchronization information generation section 225, the server solution generation section 223 reads the true initial solution or solution linked with at least one of the two IP addresses from the server solution recording section 224. The server solution generation section 223 then generates a new solution using the read true initial solution or solution. If at least a solution for a user apparatus 100 specified by an IP address is initially generated, the server solution generation section 223 reads the true initial solution linked with the IP address from the server solution recording section 224. The subsequent solution is generated based on the true initial solution. In this way, the server solution generation section 223 can generate the same solution as the solution generated by the user solution generation section 123 in each user apparatus 100, as described in detail later. In other words, the solution generated in the server 200 and the solution generated in the user apparatus 100 are synchronized with each other.

The solution generated by the server solution generation section 223 is transmitted to the synchronization information generation section 225.

The synchronization information generation section 225 is to generate the synchronization information. The synchronization information is information required for at least one of the two user apparatuses 100 as the specified user apparatuses to synchronize the solutions in the two user apparatuses 100 in order to establish encrypted communication between the two user apparatuses 100. In short, the synchronization information is information required for synchronization of the solutions in the two user apparatuses 100 and is not the solutions themselves. The synchronization information will be described in detail later. The reason why the synchronization information is required is as follows. In order for two user apparatuses 100 as specified user apparatuses that are to establish encrypted communication to generate synchronized solutions, the two user apparatuses 100 need to have a common solution (the initial solution in this embodiment, for example), as with the server 200 and the user apparatus 100 needing to have a common true initial solution in order to generate synchronized solutions, as described earlier with regard to this embodiment. And in order to meet the need, some information that enables synchronization of solutions between the two user apparatuses 100, each of which has no knowledge about the solution in the other apparatus, needs to be provided. In this embodiment, without limitation, this can be achieved by one server 200, and a specific example of the means therefor is the synchronization information.

When the synchronization information generation section 225 receives the specification information from the main control section 222, the synchronization information generation section 225 generates the synchronization information. In generating the synchronization information, the synchronization information generation section 225 uses a solution synchronized with the solution generated in the user apparatus 100 specified by the specification information. To generate the solution, the synchronization information generation section 225 transmits an instruction to generate a solution and the synchronization information required for generation of the solution to the server solution generation section 223. The solution generated by the server solution generation section 223 is transmitted to the synchronization information generation section 225, and the synchronization information generation section 225 can generate the synchronization information using the received solution.

Once the synchronization information generation section 225 generates the synchronization information, the synchronization information generation section 225 transmits both the synchronization information and the specification information to the output section 227.

The output section 227 is to output data generated in a functional block in the server 200 to the interface.

The output section 227 receives the specification information and the synchronization information transmitted from the synchronization information generation section 225 as described above. Once the output section 227 receives the synchronization information, the output section 227 outputs synchronization information and the specification information to the interface. The synchronization information and the specification information are transmitted from the interface to the transmission/reception mechanism, and then transmitted from the transmission/reception mechanism to at least one of the two user apparatuses 100 specified by the specification information via the network 400.

Next, a method of using the transmission/reception system described above and an operation of the transmission/reception system will be described with reference to FIG. 6.

A user who tries to establish encrypted communication between the user apparatus 100 of their own and another user apparatus 100 first operates the input device 102 of the user apparatus 100 of their own to enter specification information that specifies the user apparatus 100 on the other end of the encrypted communication. In this way, the specification information, which is information that specifies the two user apparatuses 100 as the specified user apparatuses that are to perform encrypted communication, is generated (S1001). The data of the specification information is transmitted to the input section 121 via the interface 114, and then transmitted from the input section 121 to the main control section 122.

When the main control section 122 receives the specification information, the main control section 122 transmits the specification information to the output section 127. The output section 127 transmits the received specification information to the interface 114. The interface 114 transmits the received specification information to the transmission/reception mechanism. The specification information is transmitted from the transmission/reception mechanism to the server 200 via the network 400 (S1002).

The server 200 receives the specification information transmitted from the user apparatus 100 at the transmission/reception mechanism thereof (S2001). The specification information is transmitted to the interface of the server 200, and then transmitted from the interface to the input section 221. When the input section 221 receives the data of the specification information from the interface, the input section 221 transmits the data to the main control section 222.

When the main control section 222 receives the data of the specification information from the input section 221, the main control section 222 transmits the specification information to the synchronization information generation section 225. In response to this, the synchronization information generation section 225 generates the synchronization information, which is information required for the two user apparatuses 100 as the specified user apparatuses specified by the specification information to synchronize the solutions required for the user apparatuses to perform encrypted communication (S2002).

A method of generating the synchronization information will be described as an example.

In this embodiment, a solution that can be generated by any of the two user apparatuses 100 specified by the specification information is used as the synchronization information. In this embodiment, without limitation, a solution that can be generated by the user solution generation section 123 in the user apparatus 100 that has transmitted the specification information is used as the synchronization information.

Therefore, the synchronization information generation section 225 requires such a solution. For this reason, the synchronization information generation section 225 transmits an instruction to generate such a solution to the server solution generation section 223 along with the specification information. Of course, the specification information transmitted in this step may be only the IP address of the user apparatus 100 that has transmitted the specification information, rather than the whole of the specification information. This holds true for the other embodiments or modifications. That is, the synchronization information generation section 225 has only to transmit only the required IP address to the server solution generation section 223.

In this embodiment, the server solution generation section 223 retrieves the true initial solution or solution linked with the IP address of the user apparatus 100 that has transmitted the specification information of the two IP addresses included in the specification information. As described above, in this embodiment, the server solution generation section 223 reads the data of the true initial solution stored in the server solution recording section 224 at least when the server solution generation section 223 generates a solution for the first time. The data of the true initial solution is a 20-digit character string including numerals and lower-case alphabetic characters, for example. The true initial solution is unique to each user apparatus 100 and assigned to each user apparatus 100 by the server 200 or an administrator of the server 200. There may be one or more true initial solutions. In this embodiment, there is a single true initial solution, and the server solution generation section 223 reads the single true initial solution from the server solution recording section 224.

The server solution generation section 223 generates a solution at the current point in time by performing an operation on the true initial solution.

First, to enable operation, the true initial solution is converted into a character string including only numerals. If the true initial solution includes an alphabetic character, the alphabetic character is replaced with a two-digit numeral. The replacement numeral is the ordinal number of the character in alphabetical order. For example, "a" is converted into "01", "b" is converted into "02", and "z" is converted into "26". For example, suppose that the true initial solution is "5a6458p6556ff4272149". According to the principle described above, the true initial solution is converted into a character string including only numerals "50164581665560606064272149". The number of digits of the character string including only numerals is greater than the number of digits of the original character string by the number of the alphabetic characters included in the true initial solution. If a user wishes to include symbols such as "(", ")", "!", "&" or ":" in the solution, the user can assign an appropriate numeral to each symbol, such as "27" to "(", "28" to ")" and "29" to "!".

Then, an operation is performed on the resulting numerals. The operation determines a string of numerals, from which a solution is to be derived. Provided that the string of numerals is denoted by X, the string X at a predetermined point in time is determined from the year, the month, the day, the hour and the minute of the point in time as follows. $X_1$ in the following formula represents numerals representing true initial solutions. In this embodiment, it is supposed there are five true initial solutions, because the solutions vary with the five elements, year, month, day, hour and minute. Such an approach of synchronizing solutions according to time is similar to conventional time synchronization approaches.

$$X = X_1^P X_1^Q + X_1^R X_1^S + X_1 T$$

In the formula, P denotes the remainder after division of the numeral representing the year by 5 plus 1, Q denotes the remainder after division of the numeral representing the month by 5 plus 1, R denotes the remainder after division of the numeral representing the day by 5 plus 1, S denotes the remainder after division of the numeral representing the hour by 5 plus 1, and T denotes the remainder after division of the numeral representing the minute by 5 plus 1. In this way, a different string of numerals can be obtained at each point in time. The reason why the process of determining P to T involves addition of 1 is as follows. If P to T happen to be all 0, the final solution X is 5. The addition is involved to prevent such a simple numeral from frequently occurring.

The operation described above provides the string of numerals X, from which a solution is to be derived. If the string of numerals includes any two-digit number from 01 to 26, the number is then converted into a corresponding alphabetic character a to z according to a principle that is reverse to the principle of conversion from alphabetic characters to numerals described above.

The resulting character string including numerals and lower-case alphabetic characters typically contains 20 or more digits. If the character string contains 20 or more digits, the first 20 characters of the character string are extracted and used as a solution, for example. If the character string including numerals and lower-case alphabetic characters produced as described above contains just 20 digits, the character string is used as a solution without change. If the character string including numerals and lower-case alphabetic characters produced as described above contains less than 20 digits, the number of digits is increased based on some principle. For example, based on the first numeral or alphabetic character in the character string, some numeral or character may be inserted into the character string until the number of digits reaches 20. Alternatively, a string of numerals may be produced by performing an operation according to the above-described formula with P and T interchanged, the above-described process of conversion from numeral to alphabet may be performed on the resulting string of numerals to produce a new character string including numerals and lower-case alphabetic characters, and the new character string may be added to the tail of the original character string including numerals and alphabetic characters. Such a procedure may be repeated until the number of digits of the final character string reaches 20, and the first 20 characters in the final character string may be extracted and used as a solution.

In any case, a solution corresponding to the date and time of a point in time is generated based on the true initial solution. In this embodiment, without limitation, it is supposed that the server solution generation section 223 in the server 200 generates a solution at a time that is "five minutes after" the time when the user apparatus 100 transmitted the specification information to the server 200 (the time specified by a timestamp added to a data packet for transmitting the specification information in the user apparatus 100 at the time of transmission of the specification information, for example). Such a time may be a future time, and this holds true for the embodiments or modifications described later.

The server solution generation section 223 transmits the generated solution to the synchronization information generation section 225.

The synchronization information generation section 225 receives the solution from the server solution generation section 223. The synchronization information generation section 225 designates the received solution as synchronization information, and transmits the synchronization information to the output section 227 as the specification information. The output section 227 transmits the synchronization information to the transmission/reception mechanism via the interface. The transmission/reception mechanism transmits the synchronization information to the user apparatus 100 other than the user apparatus 100 having transmitted specification information, of the user apparatuses specified by the IP addresses included in the specification information (S2003).

Of the IP addresses included in the specification information, what is necessary is only the IP address of the user apparatus 100 that transmits the synchronization information. Therefore, the whole of the specification information (both the IP addresses of the two user apparatuses 100) does not always need to be transmitted from the synchronization information generation section 225 to the transmission/reception mechanism via the output section 227 and the interface, and the required IP address has only to be transmitted. This holds true for the embodiments or the like described later.

The synchronization information is transmitted to the user apparatus 100 other than the user apparatus 100 having transmitted the specification information to the server 200, of the user apparatuses 100 specified by the two IP addresses included in the specification information. The synchronization information is not transmitted to the user apparatus 100 having transmitted the specification information to the server 200. The transmission of the synchronization information in this step may be encrypted communication. Of course, the encrypted communication in this step may not be encrypted communication using successively generated solutions, such as the encrypted communication between the two user apparatuses 100 as the specified user apparatuses, and may be encrypted communication based on a known technique.

Of the user apparatuses 100 specified by the two IP addresses included in the specification information, the user apparatus 100 other than the user apparatus 100 having transmitted the specification information to the server 200 receives the synchronization information at the transmission/reception mechanism thereof (S1003). The received synchronization information is transmitted to the input section 121 via the interface 114, and then transmitted from the input section 121 to the user initial solution generation section 125 via the main control section 122.

The user initial solution generation section 125 in the user apparatus 100 having received the synchronization information generates an initial solution based on the synchronization information as described below.

The user initial solution generation section 125 receives the synchronization information as described above. The synchronization information is a solution that can be generated by the user apparatus 100 that has transmitted the specification information to the server 200 and does not receive the synchronization information from the server 200 of the user apparatuses 100 specified by the specification information. The user initial solution generation section 125 generates a new solution from the solution. The solution is generated by the user solution generation section 123 having received an instruction to generate a solution in the manner described below from the user initial solution generation section 125. The user solution generation section 123 receives such an instruction and the synchronization information, which is a solution required for generation of a new solution, from the user initial solution generation section 125.

The user solution generation section 123 generates a new solution in the manner described below.

For example, it is supposed that the synchronization information, which is a solution, is denoted by $X_2$. The user initial solution generation section 125 generates a new solution in the same manner as the manner used for generating the synchronization information, which is a solution, in the server 200, specifically, according to the following formula.

$$X = X_2^P + X_2^Q + X_2^S + X_2^T$$

When a solution is generated according to such a formula, a certain time for determining P, Q, R, S and T needs to be determined as described above. In order to synchronize the solutions subsequently generated in the user apparatus 100 that receives the synchronization information and the user apparatus 100 that does not receive the synchronization information (in other words, in order to make the initial solutions agree with each other), the same time needs to be shared by the user apparatuses 100. For example, this requirement is met if an agreement that "the user solution generation section 123 generates a solution at a time "ten minutes after" the time when the user apparatus 100 transmitted the specification information to the server 200" is made between at least the two user apparatuses 100 as the specified user apparatuses (preferably between all the user apparatuses 100). For example, a code for satisfying such a requirement may be embedded in a computer program that makes the user apparatus 100 function as the "user apparatus" according to the present invention.

In any case, in this way, the user solution generation section 123 in the user apparatus 100 having received the synchronization information uses the synchronization information to generate a solution at a time "ten minutes after" the time when the user apparatus 100 transmitted the specification information to the server 200. The solution thus generated is transmitted from the user solution generation section 123 to the user initial solution generation section 125.

The user initial solution generation section 125 designates the solution as an initial solution used for generating a solution in encrypted communication with the user apparatus 100 having transmitted the specification information to the server 200. The initial solution thus determined is stored in the user solution recording section 124.

On the other hand, the user apparatus 100 that does not receive the synchronization information determines an initial solution as described below.

After the transmission of the specification information to the server 200 described above (S1002) ends, the main control section 122 issues an instruction to generate an initial solution to the user initial solution generation section 125. The user initial solution generation section 125 having received such an instruction issues an instruction to generate a solution to the user solution generation section 123. The user solution generation section 123 generates a new solution based on the true initial solution stored in the user solution recording section 124.

The manner in which the user solution generation section 123 generates a solution is the same as the manner in which the server solution generation section 223 in the server 200 generates a solution. Therefore, the solution generated by the user solution generation section 123 must be the same as the above-described solution generated by the server solution generation section 223 and designated as an initial solution by the user initial solution generation section 125 in the other user apparatus 100, as far as the true initial solution is common between the user apparatus 100 and the server 200. In addition, the true initial solution read by the server solution generation section 223 in the server 200 from the server solution recording section 224 is the same as the true initial solution read by the user initial solution generation section 125 from the user solution recording section 124 which is used to generate the above-described solution. In this embodiment, both the true initial solutions are $X_1$ and same. Therefore, the user initial solution generation section 125 generates the same solution ($X_2$ in this embodiment) as the solution as the synchronization information, which has been transmitted by the user apparatus 100 to the user apparatus 100 on the other end of the encrypted communication. In this way, the user apparatus 100 has the same solution, $X_2$, as the solution that the user apparatus 100 having received the synchronization information obtains as the synchronization information, even though the user apparatus 100 does not receive the synchronization information from the server 200.

In order for the solution to be the same as the solution generated by the server solution generation section 223, the user apparatus 100 and the server 200 need to share a rule that a solution is generated at a time "five minutes after" the time when the user apparatus 100 transmitted the specification information to the server 200 (the time specified by a timestamp added to a data packet for transmitting the specification information in the user apparatus 100 at the time of transmission of the specification information, for example). Such a rule, specifically, the rule that "a solution is generated at a time "five minutes after" the time when the user apparatus 100 transmitted the specification information to the server 200" may be previously established in the user apparatus 100 by the function of the above-described computer program that makes the user apparatus 100 function as the "user apparatus 100" according to the present invention, for example. Alternatively, instead of transmitting the synchronization information, the server 200 may transmits an instruction to "generate a solution at a time "five minutes after" the time when the user apparatus 100 transmitted the specification information to the server 200" to the user apparatus 100 that does not be transmitted the synchronization information. Thereby, the instruction can be shared between the server 200 and the user apparatus 100.

The user solution generation section 123 then generates a new solution from the solution ($X_2$). The solution is generated in the same manner as the manner in which the user solution generation section 123 in the other user apparatus 100 generates a new solution. Specifically, the new solution is generated by substituting $X_2$ into the following formula.

$$X=X_2^P+X_2^Q+X_2^R+X_2^S+X_2^T$$

When a solution is generated according to such a formula, a certain time for determining P, Q, R, S and T needs to be determined as described above. And as described above, the time is shared by the two user apparatuses 100 as the specified user apparatuses and is determined according to the rule that "a solution is generated at a time "ten minutes after" the time when the user apparatus 100 transmitted the specification information to the server 200". The user solution generation section 123 generates such a unique solution determined according to time. Of course, the solution is the same as the solution determined as an initial solution by the user apparatus 100 that receives the synchronization information.

The user solution generation section 123 transmits the generated solution to the user initial solution generation section 125. The user initial solution generation section 125 designates the received solution as an initial solution, and stores the initial solution in the user solution recording section 124.

In this way, the user solution recording sections 124 in the two user apparatuses 100 as the specified user apparatuses store a common initial solution. In other words, a state where the two user apparatuses 100 as the specified user apparatuses have a common initial solution occurs (S1004). In this way, the encrypted communication between the two user apparatuses 100 as the specified user apparatuses is ready.

In this state, the two user apparatuses 100 as the specified user apparatuses perform the encrypted communication (S1005).

In the following description of the encrypted communication, one of the two user apparatuses as the specified user apparatuses that are to perform the encrypted communication will be referred to as a first user apparatus 100, and the other will be referred to as a second user apparatus 100.

First, a case where the first user apparatus 100 transmits encrypted data to the second user apparatus will be described.

In principle, which of the two user apparatuses 100 transmits the encrypted data to the other user apparatus 100 is arbitrarily determined. Whether the first user apparatus 100 transmits the encrypted data to the second user apparatus 100 or the second user apparatus 100 transmits the encrypted data to the first user apparatus 100, the processes performed in the user apparatuses 100 themselves are the same except that the processes performed in the user apparatuses 100 are interchanged.

The user of the first user apparatus 100 operates the input device 102 of the user apparatus 100 to generate the transmission data. The transmission data is plaintext data.

In the first user apparatus 100, the transmission data is transmitted from the interface 114 to the input section 121, and further transmitted from the input section 121 to the user encryption/decryption section 126. The user encryption/decryption section 126 encrypts the transmission data using a solution. The user encryption/decryption section 126 transmits an instruction to generate a solution to the user solution generation section 123, in order to make the user solution generation section 123 generate a solution. When the user solution generation section 123 receives the instruction, the user solution generation section 123 generates a new solution.

The user solution generation section 123 can generate the solution in any manner as far as the solutions generated by the user solution generation sections 123 in the two user apparatuses 100 are synchronized. For example, the method of synchronizing the solution generated by the user solution generation section 123 and the solution generated by the server solution generation section 223 may be different from the method of synchronizing the solutions generated by the user solution generation sections 123 in the two user apparatuses 100 as the specified user apparatuses. In this embodiment, without limitation, the latter method is adopted.

In this embodiment, regardless of the current time, the user solution generation section 123 in the first user apparatus 100 generates a solution corresponding to a time that is one minute, one hour, one day, one month and one year after the above-described time which was used to generate for the initial solution.

The user solution generation section 123 generates a new solution using the initial solution read from the user solution recording section 124 in the manner described above at the time described above.

In the first user apparatus, the new solution is transmitted from the user solution generation section 123 to the user encryption/decryption section 126.

The user encryption/decryption section 126 receives the new solution from the user solution generation section 123, and encrypts the transmission data using the new solution.

In this case, the solution can be used in any way. For example, if the user apparatus 100 and the server 200 performs a common-key encrypted communication, the user encryption/decryption section 126 can use the new solution as a common key. That is, the solution can be used as a key for encryption. Alternatively, the solution may also be used to modify the encryption algorithm. The solution may also be used in such a manner that one algorithm is selected from among a plurality of algorithms based on the solution.

In any case, the transmission data is encrypted into encrypted data by the user encryption/decryption section 126.

The generated encrypted data is transmitted from the user encryption/decryption section 126 to the output section 127.

The output section 127 in the first user apparatus 100 transmits the encrypted data to the transmission/reception mechanism via the interface 114. The encrypted data is transmitted to the second user apparatus 100 via the network 400.

The second user apparatus 100 receives the encrypted data transmitted from the first user apparatus 100 at the transmission/reception mechanism thereof. The encrypted data is transmitted from the transmission/reception mechanism to the input section 121 via the interface 114. The input section 121 transmits the encrypted data to the user encryption/decryption section 126.

The user encryption/decryption section 126 in the second user apparatus 100 having received the encrypted data decrypts the encrypted data. To achieve this, the user encryption/decryption section 126 uses a solution generated by the user solution generation section 123. In order to make the user solution generation section 123 generate a solution, the user encryption/decryption section 126 transmits an instruction to generate a solution to the user solution generation section 123. When the user solution generation section 123 receives the instruction, the user solution generation section 123 generates a new solution.

The manner in which the user solution generation section 123 in the second user apparatus 100 generates a solution is the same as the manner in which the user solution generation section 123 in the first user apparatus 100 generates a solution, and the initial solution read by the user solution generation section 123 from the user solution recording section 124 is common to the initial solution used in the first user apparatus 100. Therefore, the user solution generation section 123 in the second user apparatus 100 generates the same new solution as the solution generated by the user solution generation section 123 in the first user apparatus 100. That is, the two user apparatuses 100 generate synchronized solutions.

The new solution is transmitted from the user solution generation section 123 to the user encryption/decryption section 126.

The user encryption/decryption section 126 receives the new solution from the user solution generation section 123, and decrypts the encrypted data using the new solution.

In the user encryption/decryption section 126 in the second user apparatus 100, the solution is used in the same manner as in the user encryption/decryption section 126 in the first user apparatus 100. For example, if the two user apparatuses use the solution as a common key for a common key encrypted communication, and the solution is used in that way in the first user apparatus 100, the user encryption/decryption section 126 in the second user apparatus 100 also uses the new solution as a common key.

In any case, the user encryption/decryption section 126 decrypts the encrypted data into the original plaintext transmission data.

The transmission data is transmitted from the user encryption/decryption section 126 to the output section 127, and then transmitted from the output section 127 to another application in the second user apparatus 100 via the interface 114, or transmitted to the display 101 and appropriately displayed.

In the case where the second user apparatus 100 transmits encrypted data to the first user apparatus 100, the role of the first user apparatus 100 and the role of the second user apparatus 100 in the above description are interchanged.

When the encrypted communication is no longer required, the encrypted communication is ended.

In the communication system in this embodiment, only one solution or a fixed solution is used in the step S1005 in which the encrypted communication is performed. Alternatively, for example, solutions used for encryption or decryption may be successively generated by the user solution generation sections 123 in the two user apparatuses 100 as the specified user apparatuses, like common keys being successively renewed for a common key encrypted communication. In such a case, for example, like an agreement that solutions corresponding to a time that is one minute, one hour, one day, one month and one year after the above-described time which was used to generate for the initial solution being made between the user solution generation section 123 and the server solution generation section 223 in order to generate new solutions subsequent to the solution used for authentication, an agreement such as that solutions subsequently generated are those generated at one minute, two minute, three minute and so on after the time when the solution used for authentication is generated may be made between the user solution generation section 123 and the server solution generation section 223. Of course, a more complicated agreement may be made between the user solution generation section 123 and the server solution generation section 223.

The time to change the solution used for encryption and decryption by the user encryption/decryption sections 126 in the two user apparatuses 100 as the specified user apparatuses, like successively renewing common keys for a common key encrypted communication, may be appropriately determined. For example, the solution used for encryption or decryption may be changed or updated to a new solution each time a predetermined time lapses after the encrypted communication is started. Alternatively, the solution may be changed or updated each time the amount of encrypted data exceeds a predetermined data amount. For example, a typical approach to encrypting plaintext data involves dividing the plaintext data into subsets of a predetermined number of bits of data and performing an encryption operation for each subset, rather than performing an operation for the whole of the plaintext data. For example, a new solution may be generated to change the common key each time 10 subsets are encrypted, or even each time one subset is encrypted. Of course, when such an encryption is performed, solutions are generated in the same manner and the solution used as the common key is changed in the same manner on the side where decryption is performed. The two user apparatuses 100 as the specified user apparatuses can perform such processes.

Once solutions are synchronized between the two user apparatuses 100 as the specified user apparatuses as described above, the two user apparatuses 100 as the specified user apparatuses can permanently maintain the state where the solutions are synchronized as far as the two user apparatuses 100 are operating.

For example, if the last solutions generated in the user apparatuses 100 when the encrypted communication ends are stored in the user solution recording sections 124 in the user apparatuses 100 as an initial solution used for the subsequent encrypted communication, the two user apparatuses 100 can perform the subsequent encrypted communication using synchronized solutions without the need for the server 200 to generate synchronization information.

Of course, the user apparatuses 100 may not store an initial solution as described above, and may receive synchronization information from the server 200 and repeat the process described above each time the user apparatuses 100 perform encrypted communication.

In this embodiment, the synchronization information is transmitted to only one of the two user apparatuses 100 as the specified user apparatuses. However, the synchronization information may be transmitted to both the two user apparatuses 100. If the user apparatus 100 that is not supposed to receive the synchronization information in this embodiment receives the synchronization information, the user apparatus 100 can generate the solution specified by the synchronization information by itself. Nevertheless, the user apparatus 100 can compare the solution generated by itself with the solution specified by the synchronization information to check that the two solutions agree with each other and that the solution generated by itself is not erroneous.

First Modification

In the following, a modification of the communication system described above will be described.

The communication system described below differs from the communication system according to the first embodiment described above only in the manner of synchronizing solutions between the server 200 and each user apparatus 100 and the manner of synchronizing solutions between two user apparatuses 100 as specified user apparatuses.

In the other respects, such as usage or operation, the communication system according to the first modification and the communication system according to the first embodiment are the same.

In the first embodiment, the user solution generation section 123 of the user apparatus 100 and the server solution generation section 223 of the server 200 generate a solution based on a solution synchronization like the time synchronization in the conventional one-time password generation using a token or the like. To the contrary, the first modification adopts a solution synchronization technique like the event synchronization in the conventional one-time password generation, in which solutions are synchronized based on the number of the solutions generated in the past (or based on the ordinal number of the generated solution (that is, what number solution the generated solution is).

According to the method of generating a new solution according to the first modification, the user solution generation section 123 and the server solution generation section 223 can successively generate solutions by performing a predetermined operation on an initial solution to generate a solution, performing the predetermined operation on the latter solution to generate a solution, performing the predetermined operation on the latter solution to generate a solution and so on. Such a technique is well-known as a technique for generating a pseudo-random number.

A method in which the user solution generation section 123 and the server solution generation section 223 generate a solution will now be specifically described. The user solution generation section 123 in the user apparatus 100 and the server solution generation section 223 in the server 200 generate a new solution in the same manner, and therefore, the following description will be made without differentiating the solution generation sections. In addition, the initial solution and the true initial solution will also not be differentiated and collectively referred to as an initial solution in the following description.

A solution can be generated each time a solution is needed, by using an initial solution (there may be two or more solutions, such as in the cases (a) and (c) described below) and substituting a past solution into a predetermined function to generate a new solution. In this way, solutions can be successively generated. In this case, the solutions are pseudo-random numbers dependent on the initial solution.

The following (a) to (c) are example functions used to generate a solution. The functions (a) to (c) are formulas for generating the N-th solution $X_N$. In these formulas, P, Q, R and S represent appropriate natural numbers.

$$(X_N) = (X_{N-1})^P + (X_{N-2})^Q \quad \text{(a)}$$

$$(X_N) = (X_{N-1})^P \quad \text{(b)}$$

$$(X_N) = (X_{N-1})^P (X_{N-2})^Q (X_{N-3})^R (X_{N-4})^S \quad \text{(c)}$$

In the function (a), two past solutions are used, and a new solution is generated by summing one of the two solutions raised to the P-th power and the other raised to the Q-th power. Strictly speaking, the sum of one past solution raised to the P-th power and the other past solution raised to the Q-th power has a larger number of digits than the original solutions, and thus, a new solution is generated by extracting, from the number representing the sum, an appropriate number of digits, such an appropriate number of digits from the head of the number representing the sum, an appropriate number of digits from the tail of the number representing the sum, or an appropriate part having an appropriate number of digits of the number representing the sum. In this embodiment, without limitation, the solution has 20 digits.

In the function (b), one past solution is used, and a new solution is generated by trimming the solution raised to the P-th power in the manner described above.

In the function (c), four past solutions are used, and a new solution is generated by calculating the product of one of the past solutions raised to the P-th power, another raised to the Q-th power, another raised to the R-th power and the remaining one raised to the S-th power and the trimming the number representing the product in the manner described above.

The functions (a) to (c) are example algorithms for generating a solution, and the algorithms may be modified during generation of solutions. For example, the algorithms (a) to (c) described above may be used in a round-robin manner.

The approaches using the formulas (a) to (c) described above can be applied only when the solutions include only numerals. In order to include a letter or symbol in a solution, the process of converting letters or symbols into numerals described with regard to the first embodiment can be applied.

According to the method of successively generating solutions according to the formulas described above, the solution of the same ordinal number is always the same as far as the initial solution is not changed.

As far as a common algorithm is used, and a common initial solution is shared, the server solution generation section 223 in the server 200 and the user solution generation section 123 in the user apparatus 100 can generate synchronized common solutions, and the user solution generation sections 123 in the two user apparatuses 100 as the specified user apparatuses can generate synchronized common solutions.

In the first modification, without limitation, the user solution generation section 123 and the server solution generation section 223 generate a solution according to the algorithm (a) described above. Furthermore, in the first modification, the user solution generation sections 123 in the two user apparatuses 100 as the specified user apparatuses (or all the user apparatuses 100, considering that all the user apparatuses 100 can be a specified user apparatus) generate a solution according to the algorithm (a) described above.

A method of using the communication system and an operation of the communication system will be described in more detail, in order to make the configuration of the communication system clearer.

Figure 6:
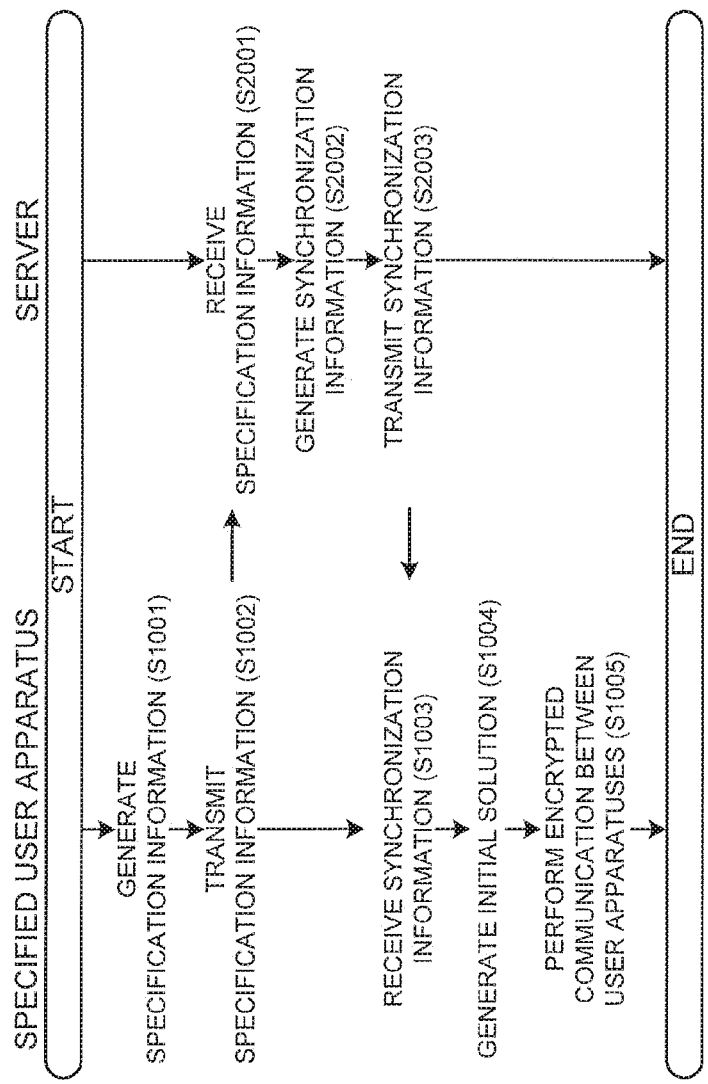
FIG. 6 shows a flow of a process performed when a communication occurs in the communication system shown in FIG. 1.

The communication system according to the first modification operates as shown in FIG. 6. In general, the operation of the communication system according to the first modification is the same as the communication system according to the first embodiment. In particular, Steps S1001 and S1002 performed in the specified user apparatus and Step S2001 performed in the server 200 are exactly the same as those in the first embodiment.

The server 200 receives the specification information. The specification information is transmitted to the synchronization information generation section 225 via the transmission/reception mechanism, the interface, the input section 221 and the main control section 222. The synchronization information generation section 225 generates the synchronization information, which is information required for the two user apparatuses 100 as the specified user apparatuses specified by the specification information to synchronize the solutions required for the user apparatuses to perform encrypted communication (S2002).

In the first modification, as in the first embodiment, a solution that can be generated by any of the two user apparatuses 100 specified by the specification information transmitted to the server 200 is used as the synchronization information. In the first modification, without limitation, as in the first embodiment, a solution that can be generated by the user solution generation section 123 in the user apparatus 100 that has transmitted the specification information is used as the synchronization information.

Therefore, the synchronization information generation section 225 requires such a solution. For this reason, the synchronization information generation section 225 transmits an instruction to generate such a solution to the server solution generation section 223 along with the specification information.

In the first modification, the server solution generation section 223 retrieves a true initial solution or solution linked with the IP address of the user apparatus 100 that has transmitted the specification information of the two IP addresses included in the specification information. As described above, in this modification, the server solution generation section 223 reads the data of a true initial solution stored in the server solution recording section 224 at least when the server solution generation section 223 generates a solution for the first time. The server solution recording section 224 in the server 200 in the first modification stores not only a true initial solution but also information about how many solutions have been generated in the past using the true initial solution. The server solution generation section 223 retrieves, from the server solution recording section 224, the data of a true initial solution and the information about how many solutions have been generated in the past based on the true initial solution.

In the first modification, it is supposed that, when the server solution generation section 223 is to generate a solution, the server solution generation section 223 has generated three solutions in the past, for example. Then, the server solution generation section 223 reads the true initial solution and the numeral 3, which is the number of the solutions having been generated in the past, from the server solution recording section 224. According to the formula (a) described above, the server solution generation section 223 generates the first solution $(X_1)$ from the true initial solutions $((X_0)$ and $(X_{-1}))$, generates the second solution from the first solution (strictly, from $(X_1)$ and $(X_0)$), and repeats such a procedure until the fourth solution $(X_4)$ is generated. The server solution generation section 223 then increments the number of the solutions having been generated in the past stored in the server solution recording section 224 by 1 to "4". Thus, the next solution that is to be generated by the server solution generation section 223 is $(X_5)$, the fifth solution.

The server solution generation section 223 transmits the solutions $((X_3)$ and $(X_4))$ required at least to generate the next solution $(X_5)$ to the synchronization information generation section 225. As in the first embodiment, the synchronization information generation section 225 designates the solutions as the synchronization information (S2002).

As in the first embodiment, the synchronization information is transmitted to the user apparatus 100 other than the user apparatus 100 having transmitted the specification information, of the two user apparatuses 100 as the specified user apparatuses (S2003), and is not transmitted to the user apparatus 100 having transmitted the specification information.

In the user apparatus having received the synchronization information, the synchronization information is transmitted to the user initial solution generation section 125, as in the first embodiment. The user initial solution generation section 125 generates a new solution based on the synchronization information. The new solution is a solution generated from the $(X_3)$ and $(X_4)$, which are the synchronization information. The new solution may be the fifth solution $(X_5)$ or a subsequent solution, that is, the sixth solution $(X_6)$ or a subsequent solution. However, in order to synchronize solutions, the two specified user apparatuses need to share the condition on the solution of what ordinal number should be generated.

For example, in the first modification, it is supposed that the user solution generation section 123 in the user apparatus 100 having received the synchronization information generates the fifth solution. The user solution generation section 123 determines the fifth solution $(X_5)$ by substituting $(X_4)$ and $(X_3)$ for $(X_{N-1})$ and $(X_{N-2})$ in the following formula (a), respectively.

$$(X_N) = (X_{N-1})^P + (X_{N-2})^Q \qquad (a)$$

The user solution generation section 123 then transmits the generated solutions $(X_4)$ and $(X_5)$ to the user initial solution generation section 125. The user initial solution generation section 125 designates these solutions as initial solutions, and stores the solutions in the user solution recording section 124 in the user apparatus 100, as in the first embodiment.

The user apparatus 100 that does not receive the synchronization information does not rely on the synchronization information and generates an initial solution by itself as in the first embodiment.

In the user apparatus 100 that does not receive the synchronization information, after the transmission of the specification information to the server 200 (S1002) ends, the main control section 122 issues an instruction to generate an initial solution to the user initial solution generation section 125 as in the first embodiment. The user initial solution generation section 125 having received the instruction issues an instruction to generate a new solution to the user solution generation section 123.

The manner in which the user solution generation section 123 generates a solution is the same as the manner in which the server solution generation section 223 in the server 200 generates a solution. Therefore, the solution generated by the user solution generation section 123 is the same as the solution generated by the server solution generation section 223, as far as the true initial solution is common between the user apparatuses 100, and the solutions generated from the true initial solution has the same ordinal number. The condition about how many solutions are generated and which solution is used as an initial solution is shared at least by the user apparatuses 100. The user solution recording section 124 in the user apparatus 100 stores at least information that is the same as the information before the solution required for the synchronization information is generated in the server 200, that is, the true initial solution and the information that the number of the solutions generated in the past from the true initial solution is three. Based on the true initial solution and the read number "3", the user solution generation section 123 generates the same number of solutions as those generated by the user solution generation section 123 in the user apparatus 100 having received the synchronization information. That is, the user solution generation section 123 in the user apparatus 100 that does not receive the synchronization information first generates $(X_4)$ and then $(X_5)$. In this way, the user apparatus 100 and the server 200 synchronize solutions in the same manner. Therefore, the data stored in the user solution recording section 124 is the same as the data stored in the server solution recording section 224.

The user solution generation section 123 then transmits the two solutions to the user initial solution generation section 125. The user initial solution generation section 125 designates the two solutions as initial solutions used for generation of subsequent solutions, and stores the two solutions in the user solution recording section 124.

In this way, common initial solutions are stored in the user solution recording sections 124 in the two user apparatuses 100 as the specified user apparatuses (S1004). In this way, the encrypted communication between the two user apparatuses 100 as the specified user apparatuses is ready, as in the first embodiment.

In the first modification, the server solution recording section 224 in the server 200 stores a true initial solution and information about how many solutions have been generated in the past from the true initial solution, and the user solution recording section 124 in the user apparatus 100 stores a true initial solution and the information about how many solutions have been generated in the past from the true initial solution. Therefore, the server solution generation section 223 and the user solution generation section 123 can successively generate synchronized solutions, which are the same between the server solution generation section 223 and the user solution generation section 123 if the solutions have the same ordinal number. In this case, the server solution recording section 224 and the user solution recording section 124 continue storing true initial solutions. As can be seen from the above description of the method of generating a solution to be used as an initial solution in the user apparatus 100 that receives the synchronization information, synchronization of solutions does not always require a true initial solution and the information about how many solutions have been generated in the past from the true initial solution, and new solutions can be successively generated in such a manner that the solutions of the same ordinal number are always the same, as far as the immediately preceding solution(s) are known. In such a case, the server 200 and the user apparatus 100 can perform the following process: the solution stored in the server solution recording section 224 and the user solution recording section 124 is overwritten with a solution used for generation of the second solution once the first solution is generated from the true initial solution, the solution stored in the server solution recording section 224 and the user solution recording section 124 is overwritten with a solution used for generation of the third solution once the second solution is generated from the solution, and so on.

According to the method of generating solutions in the first modification, the encrypted communication between the two user apparatuses 100 as the specified user apparatuses may require generation of a large number of solutions as described later, and a solution generated by the user solution generation section 123 may lead the corresponding solution generated by the server solution generation section 223. If such a situation occurs, the solutions generated by the user solution generation section 123 and the server solution generation section 223 go out of synchronization. To avoid this, the user solution recording section 124 should separately and independently store information required for the user solution generation section 123 to generate solutions in a state where the user solution generation section 123 is in synchronization with the server solution generation section 223 and information required for the user solution generation section 123 to generate solutions synchronized between the two user apparatuses 100 as the specified user apparatuses.

The following part of the process may be exactly the same as that in the first embodiment. That is, the process of successive synchronized solutions required to achieve the encrypted communication between the two user apparatuses as the specified user apparatuses (S1005) may be based on the time synchronization in a token or the like.

Alternatively, in the first modification, the synchronization of solutions may be based on the event synchronization implemented in a token or the like. The following description will be made on the assumption that solutions are generated in this way in the first modification.

In the following description, as in the description of the first embodiment, one of the two user apparatuses as the specified user apparatuses that are to perform the encrypted communication will be referred to as a first user apparatus 100, and the other will be referred to as a second user apparatus 100.

First, a case where the first user apparatus 100 transmits encrypted data to the second user apparatus will be described.

The user of the first user apparatus 100 operates the input device 102 of the user apparatus 100 to generate the transmission data.

In the first user apparatus 100, the transmission data is transmitted from the interface 114 to the user encryption/decryption section 126 via the input section 121. The user encryption/decryption section 126 encrypts the transmission data using a solution. The user encryption/decryption section 126 transmits an instruction to generate a solution to the user solution generation section 123, in order to make the user solution generation section 123 generate a solution. When the user solution generation section 123 receives the instruction, the user solution generation section 123 generates a new solution.

The user solution recording section 124 stores two solutions $(X_4)$ and $(X_5)$ as described above. The user solution generation section 123 in the first user apparatus 100 reads the two solutions. The user solution generation section 123 in the first user apparatus 100 can generate the sixth solution $(X_6)$ by substituting these solutions into the formula (a) described above. The user solution generation section 123 stores the solutions $(X_4)$ and $(X_5)$ used for generation of the following solution in the user solution recording section 124, and transmits the generated solution $(X_6)$ to the user encryption/decryption section 126.

The user encryption/decryption section 126 encrypts the transmission data using the solution $(X_6)$. The way of using the solution in the encryption process can be the same as that in the first embodiment. The transmission data is encrypted into encrypted data by the user encryption/decryption section 126. The generated encrypted data is transmitted from the user encryption/decryption section 126 to the output section 127.

As in the first embodiment, the encrypted data is transmitted from the first user apparatus 100 to the second user apparatus 100.

The second user apparatus 100 receives the encrypted data transmitted from the first user apparatus 100 at the transmission/reception mechanism thereof. The encrypted data is transmitted from the transmission/reception mechanism to the input section 121 via the interface 114, and is further transmitted to the user encryption/decryption section 126.

The user encryption/decryption section 126 in the second user apparatus 100 having received the encrypted data decrypts the encrypted data. To achieve this, the user encryption/decryption section 126 uses a solution generated by the user solution generation section 123. In order to make the user solution generation section 123 generate a solution, the user encryption/decryption section 126 transmits an instruction to generate a solution to the user solution generation section 123. When the user solution generation section 123 receives the instruction, the user solution generation section 123 generates a new solution.

The manner in which the user solution generation section 123 in the second user apparatus 100 generates a solution is the same as the manner in which the user solution generation section 123 in the first user apparatus 100 generates a solution, and the initial solutions read by the user solution generation section 123 from the user solution recording section 124 are common to the initial solutions $((X_4)$ and $(X_5))$ used in the first user apparatus 100. Therefore, the user solution generation section 123 in the second user apparatus 100 generates the same new solution as the solution generated by the user solution generation section 123 in the first user apparatus 100. That is, the two user apparatuses 100 generate synchronized solutions.

The new solution is transmitted from the user solution generation section 123 to the user encryption/decryption section 126. The user encryption/decryption section 126 receives the new solution from the user solution generation section 123, and decrypts the encrypted data using the new solution. The manner of decryption is the same as that in the first embodiment. The user encryption/decryption section 126 decrypts the encrypted data into the original plaintext transmission data.

The following part of the process in the communication system in the first modification is the same as that in the first embodiment.

In the case where the second user apparatus 100 transmits encrypted data to the first user apparatus 100, the role of the first user apparatus 100 and the role of the second user apparatus 100 in the above description are interchanged.

When the encrypted communication is no longer required, the encrypted communication is ended.

In the communication system in the first modification, only one solution or a fixed solution is used in the step S1005 in which the encrypted communication is performed. Alternatively, for example, new solutions used for encryption or decryption may be successively generated by the user solution generation sections 123 in the two user apparatuses 100 as the specified user apparatuses, like common keys being successively renewed for a common key encrypted communication.

As described above, if the same immediately preceding solution(s) is used, the user solution generation sections 123 in the two user apparatuses 100 can successively generate synchronized solutions. By the user solution generation sections 123 in the two user apparatuses 100 successively generating synchronized common solutions, the two user apparatuses 100 as the specified user apparatuses can perform encrypted communication using synchronized solutions.

The possible time at which a new solution is generated is as described above with regard to the first embodiment.

Whether to use solutions once synchronized between the user apparatuses 100 as the specified user apparatuses for a subsequent encrypted communication between the two user apparatuses 100 as the specified user apparatuses can be arbitrarily determined, as in the first embodiment.

In the first embodiment, the synchronization information is transmitted to the user apparatus 100 that cannot generate the solution used as an initial solution. Alternatively, the synchronization information may be transmitted to both the user apparatuses 100, each of the user apparatuses 100 may extract a solution that can only be generated by the other user apparatuses 100 from the synchronization information by using a solution which is generated by their own, and one of the solutions is designated as an initial solution (which solution is designated as an initial solution is previously agreed between the user apparatuses 100).

Second Modification

A communication system according to a second modification will be described.

The communication systems according to the second modification as well as third and fourth embodiments described later have basically the same configuration as the communication system according to the first modification, and the usage and operation of the communication systems are also the same as those of the communication system according to the first modification.

The second to fourth modifications relate to other variations of the synchronization information, which is supposed to be "a solution that can be generated by any one of the two user apparatuses 100 specified by the specification information" in the first modification. Therefore, the synchronization information in the second to fourth modifications differs from that in the first modification, and the destination of the synchronization information may be one of the two user apparatuses 100 specified by the specification information or both the two user apparatuses 100. Furthermore, the part of the process performed in the specified user apparatuses until the specified user apparatuses have a common initial solution based on the synchronization information also differs from that in the first embodiment.

The following description of the second to fourth modifications will be focused on the difference from the first modification, that is, contents of the synchronization information, the method in which the synchronization information is generated in the server 200 and the method in which an initial solution is generated in the specified user apparatus.

In the description of the second to fourth modifications, it is assumed that solutions are generated in a manner like the event synchronization in a token or the like. However, as is obvious from the relationship between the first embodiment and the first modification, the time synchronization may be used for generation of solutions, instead of the event synchronization. That is, the second to fourth modifications may adopt the time synchronization. For example, the "solution (X2) at a time "five minutes after" the time when the user apparatus 100 transmitted the specification information to the server 200, which is generated based on the true initial solution" can be regarded as the first solution generated from the true initial solution in the first modification, and the "solution at a time "ten minutes after" the time when the user apparatus 100 transmitted the specification information to the server 200, which is generated based on the solution $(X_2)$" can be regarded as the second solution generated based on the true initial solution in the second modification. The user apparatus 100 needs to generate at least one solution until an initial solution is determined. In the case where the time synchronization is used, again, if an agreement that a solution at a time is generated based on a solution, and another solution at another time is generated based on the generated solution is made between the server 200 and a required one of the two user apparatuses 100 as the specified user apparatuses, the solutions generated based on the time synchronization can be regarded as, or handled in the same way as, the solutions generated based on the event synchronization.

A method of using the communication system according to the second modification and an operation of the communication system will be described.

The part of the operation before the synchronization information generation section 225 generates the synchronization information is the same as that in the first embodiment, so that the following description will start from the generation of the synchronization information by the synchronization information generation section 225.

As in the first modification, the synchronization information generation section 225 generates the synchronization information after the specification information transmitted from the user apparatus 100 to the server 200 is transmitted from the main control section 222 to the synchronization information generation section 225. Then, the synchronization information generation section 225 generates the synchronization information.

The synchronization information in the second modification is a solution. More specifically, the synchronization information is a solution based on which the two user apparatuses 100 as the specified user apparatuses generate a new solution.

In the second modification, without limitation, the user solution generation section 123 in the user apparatus 100 generates a new solution according to the following formula (a) as in the first modification. Therefore, the user solution generation section 123 requires two solutions to generate a new solution. To this end, the synchronization information generation section 225 generates two solutions. The two solutions may be independent of the solutions generated by the two user apparatuses 100 as the specified user apparatuses that are synchronized with the solutions generated by the server solution generation section 223 in the server 200. The synchronization information generation section 225 generates the two solutions in an appropriate manner, for example, in a random manner.

$$(X_N)=(X_{N-1})^P+(X_{N-2})^Q \qquad (a)$$

If the algorithm that generates a new solution from one past solution, such as the following formula (b), is adopted by the user apparatuses 100, the synchronization information generation section 225 has only to generate one solution.

$$(X_N)=(X_{N-1})^P \qquad (b)$$

The synchronization information generation section 225 generates a set of such two solutions ($(X_0)$ and $(X_{-1})$, for example) as the synchronization information. The synchronization information is transmitted to the two user apparatuses 100 as the specified user apparatuses specified by the specification information via the network 400.

The two user apparatuses 100 generate an initial solution based on the received synchronization information.

As in the first modification, the synchronization information is transmitted to the user initial solution generation section 125. The user initial solution generation section 125 having received the synchronization information generates an initial solution used by the two user apparatuses 100 as the specified user apparatuses to perform encrypted communication.

The two user apparatuses 100 generates the initial solution in the same manner as described below.

In the two user apparatuses 100, the user initial solution generation section 125 transmits an instruction to generate a new solution based on the synchronization information to the user solution generation section 123 along with the synchronization information. In response to this, the user solution generation section 123 generates a new solution based on the two solutions included in the synchronization information. The first solution $(X_1)$ is generated by substituting the two solutions $(X_0)$ and $(X_{-1})$ into the formula (a): $(X_1)=(X_0)^P+(X_{-1})^Q$. Then, two solutions including the newly generated solution, $(X_1)$ and $(X_0)$, are used to generate the second solution $(X_2)$: $(X_2)=(X_1)^P+(X_0)^Q$. Since the solutions generated by the user solution generation sections 123 in the two user apparatuses 100 are generated based on the same two solutions ($(X_0)$ and $(X_{-1})$) included in the common synchronization information, the solutions of the same ordinal number are the same. That is, the two user apparatuses 100 generate synchronized solutions.

If the user initial solution generation sections 125 in the two user apparatuses 100 designate, as initial solutions, the solutions of the same ordinal numbers (such as $(X_2)$ and $(X_1)$) generated under an agreement previously made between the two user apparatuses 100 as the specified user apparatuses or specified by the server 200, the two user apparatuses 100 have common initial solutions. Such initial solutions are stored in the user solution recording section 124, as in the first modification.

After that, the two user apparatuses 100 as the specified user apparatuses can generate synchronized solutions based on the common initial solutions described above to perform encrypted communication, as in the first modification or the first embodiment.

Third Modification

A method of using the communication system according to the third modification and an operation of the communication system will be described.

The part of the operation before the synchronization information generation section 225 generates the synchronization information is the same as that in the first embodiment, so that the following description will start from the generation of the synchronization information by the synchronization information generation section 225.

As in the first modification, the synchronization information generation section 225 generates the synchronization information after the specification information transmitted from the user apparatus 100 to the server 200 is transmitted from the main control section 222 to the synchronization information generation section 225. Then, the synchronization information generation section 225 generates the synchronization information.

The synchronization information in the third modification is "information derived through a reversible operation from solutions that can be generated by the two user solution generation sections 123 in the two user apparatuses 100 as the specified user apparatuses". In order to generate such a solution, the solutions that can be generated by the two user apparatuses 100 are required, so that the synchronization information generation section 225 transmits the specification information and an instruction to generate solutions that can be generated by the two user apparatuses 100 to the server solution generation section 223.

The server solution generation section 223 having received the instruction generates solutions that can be generated by the user solution generation sections 123 in the two user apparatuses 100. In the following description, a solution that can be generated by a first user apparatus 100 of the two user apparatuses 100 is denoted by $(X_{AN})$ (N represents a numeral), and a solution that can be generated by a second user apparatus 100 of the two user apparatuses 100 is denoted by $(X_{BN})$ (N represents a numeral).

In the third modification, without limitation, the user solution generation section 123 in the user apparatus 100 generates a new solution according to the formula (a), as in the first modification.

As a solution that can be subsequently generated by the first user apparatus 100, if the solutions up to the fourth solution have already been generated in synchronization by the server 200 and the first user apparatus 100, for example, the server solution generation section 223 generates the fifth solution $(X_{A5})$ to produce a pair of solutions ($(X_{A5})$ and $(X_{A4})$) required to generate the sixth solution $(X_{A6})$, for example. Furthermore, as a solution that can be subsequently generated by the second user apparatus 100, if the solutions up to the fifteenth solution have already been generated in synchronization by the server 200 and the second user apparatus 100, for example, the server solution generation section 223 generates the sixteenth solution $(X_{B16})$ to produce a pair of solutions ($(X_{B16})$ and $(X_{B15})$) required to generate the seventeenth solution $(X_{B17})$, for example. All these solutions are transmitted to the synchronization information generation section 225.

The synchronization information generation section 225 performs an operation on the pair of solutions. The operation is a reversible operation, such as a multiplication of the two solutions or an exclusive OR of the two solutions. In the third modification, without limitation, the operation is a multiplication of a pair of solutions. Since a pair of solutions includes two solutions, two operations $(X_{A5}) \times (X_{B16})$ and $(X_{A4}) \times (X_{B15})$ are performed. As a result, the synchronization information generation section 225 obtains a pair of pieces of information ($(X_{A5}) \times (X_{B16})$ and $(X_{A4}) \times (X_{B15})$).

The synchronization information generation section 225 designates the information as the synchronization information.

The synchronization information may be transmitted to any of the two user apparatuses 100 as the specified user apparatuses.

The user apparatus 100 having received the synchronization information generates initial solutions as described below. Without limitation, it is supposed here that the synchronization information is transmitted to the first user apparatus 100 described above.

As in the first modification, the synchronization information is transmitted to the user initial solution generation section 125 in the first user apparatus 100. The user initial solution generation section 125 having received the synchronization information generates initial solutions used for the two user apparatuses 100 as the specified user apparatuses to perform encrypted communication. To this end, the user initial solution generation section 125 transmits an instruction to generate a solution to the user solution generation section 123. The user solution generation section 123 generates a solution. As repeatedly described above, the user solution generation section 123 in the first user apparatus 100 can generate solutions synchronized with solutions generated by the server solution generation section 223 in the server 200. In this example, the user solution generation section 123 can generate two solutions $(X_{A5})$ and $(X_{A4})$, which are solutions generated by the synchronization information generation section 225 in the server 200 as solutions that can be generated by the first user apparatus 100 when generating the synchronization information. The condition for what number solution is to be generated is shared in advance between the server 200 and the user apparatus 100, for example.

The user solution generation section 123 transmits the generated two solutions to the user initial solution generation section 125. Using the two solutions $(X_{A5})$ and $(X_{A4})$, the user initial solution generation section 125 performs a reverse operation, which is reverse to the operation performed in the synchronization information generation section 225 in the server 200, on the synchronization information transmitted from the server 200. Specifically, reverse operations $(X_{A5}) \times (X_{B16})/(X_{A5})$ and $(X_{A4}) \times (X_{B15})/(X_{A4})$ are performed. As a result, the user initial solution generation section 125 obtains a pair of solutions $((X_{B16}), (X_{B15}))$.

The pair of solutions are solutions generated by the second user apparatus 100, which would otherwise not available to the first user apparatus 100. These two solutions are required for the apparatus to generate the seventeenth solution $(X_{B17})$.

The user initial solution generation section 125 designates the pair of solutions as initial solutions and stores the solutions in the user solution recording section 124.

The second user apparatus 100 that does not receive the synchronization information generates initial solutions as described below.

Before the second user apparatus 100 starts communication with the first user apparatus 100 (for example, when the second user apparatus 100 receives a request for encrypted communication from the first user apparatus 100), the main control section 122 issues an instruction to generate an initial solution to the user initial solution generation section 125.

The user initial solution generation section 125 having received the instruction issues an instruction to generate a solution to the user solution generation section 123. As repeatedly described above, the user solution generation section 123 in the second user apparatus 100 can generate solutions synchronized with solutions generated by the server solution generation section 223 in the server 200. In this example, the user solution generation section 123 can generate two solutions $(X_{B16})$ and $(X_{B15})$, which are solutions generated by the synchronization information generation section 225 in the server 200 as solutions that can be generated by the second user apparatus 100 when generating the synchronization information. The condition for what number solution is to be generated is shared in advance between the server 200 and the user apparatus 100, for example.

The user initial solution generation section 125 designates the pair of solutions as initial solutions and stores the solutions in the user solution recording section 124.

In this way, the same initial solutions are shared by the two user apparatuses 100 as the specified user apparatuses.

After that, the two user apparatuses 100 as the specified user apparatuses can generate synchronized solutions based on the common initial solutions described above to perform encrypted communication, as in the first modification or the first embodiment.

The third modification has been described with regard to a case where the user apparatus 100 requires two past solutions to generate a new solution. However, if the user apparatus 100 requires only one past solution to generate a new solution, the synchronization information transmitted from the server 200 to the user apparatus 100 is not the pair of pieces of information based on solutions, but can be one piece of information. This holds true for the fourth modification.

In the third modification, the synchronization information is transmitted to the user apparatus 100 that cannot generate a solution used as an initial solution. Alternatively, the synchronization information may be transmitted to both the user apparatuses 100, each of the user apparatuses 100 may extract a solution that can only be generated by the other user apparatuses 100 from the synchronization information by using a solution which is generated by their own, and one of the solutions is designated as an initial solution (which solution is designated as an initial solution is previously agreed between the user apparatuses 100).

Fourth Modification

A method of using the communication system according to the fourth modification and an operation of the communication system will be described.

The part of the operation before the synchronization information generation section 225 generates the synchronization information is the same as that in the first embodiment, so that the following description will start from the generation of the synchronization information by the synchronization information generation section 225.

As in the first modification, the synchronization information generation section 225 generates the synchronization information after the specification information transmitted from the user apparatus 100 to the server 200 is transmitted from the main control section 222 to the synchronization information generation section 225. Then, the synchronization information generation section 225 generates the synchronization information.

In the fourth modification, two types of information are generated as the synchronization information. The synchronization information generated in the fourth modification is "information derived through a reversible operation from each of the solutions that can be generated by the two user solution generation sections 123 in the two user apparatuses 100 as the specified user apparatuses and initial solutions shared by the two user apparatuses 100 as the specified user apparatuses". In order to generate such a solution, the solutions that can be generated by the two user apparatuses 100 are required, so that the synchronization information generation section 225 transmits the specification information and an instruction to generate solutions that can be generated by the two user apparatuses 100 to the server solution generation section 223.

The server solution generation section 223 having received the instruction generates solutions that can be generated by the user solution generation sections 123 in the two user apparatuses 100. In the following description, as in the third modification, a solution that can be generated by a first user apparatus 100 of the two user apparatuses 100 is denoted by $(X_{AN})$ (N represents a numeral), and a solution that can be generated by a second user apparatus 100 of the two user apparatuses 100 is denoted by $(X_{BN})$ (N represents a numeral).

In the fourth modification, without limitation, the user solution generation section 123 in the user apparatus 100 generates a new solution according to the formula (a), as in the first modification.

As a solution that can be subsequently generated by the first user apparatus 100, if the solutions up to the fourth solution have already been generated in synchronization by the server 200 and the first user apparatus 100, for example, the server solution generation section 223 generates the fifth solution $(X_{A5})$ to produce a pair of solutions $((X_{A5})$ and $(X_{A4}))$ required to generate the sixth solution $(X_{A6})$, for example. Furthermore, as a solution that can be subsequently generated by the second user apparatus 100, if the solutions up to the fifteenth solution have already been generated in synchronization by the server 200 and the second user apparatus 100, for example, the server solution generation section 223 generates the sixteenth solution $(X_{B16})$ to produce a pair of solutions $((X_{B16})$ and $(X_{B15}))$ required to generate the seventeenth solution $(X_{B17})$, for example. All these solutions are transmitted to the synchronization information generation section 225.

The synchronization information generation section 225 performs an operation on each of the two solutions. The operation is a reversible operation, such as a multiplication of a solution and an initial solution commonly used by the two user apparatuses 100 as the specified user apparatus or an exclusive OR of a solution and an initial solution. In the fourth modification, without limitation, the operation is a multiplication of a solution and initial solutions. The initial solutions are denoted by $(Y_1)$ and $(Y_0)$. The initial solutions may be appropriately generated by the synchronization information generation section 225, for example. The two pairs of solutions each contain two solutions, and two operations $(X_{A5}) \times (Y_1)$ and $(X_{A4}) \times (Y_0)$ are performed. As a result, the synchronization information generation section 225 obtains a pair of pieces of information $((X_{A5}) \times (Y_1)$ and $(X_{A4}) \times (Y_0))$. The synchronization information generation section 225 designates the information as the synchronization information for the first user apparatus 100. Furthermore, the synchronization information generation section 225 performs two operations $(X_{B16}) \times (Y_1)$ and $(X_{B15}) \times (Y_0)$. As a result, the synchronization information generation section 225 obtains a pair of pieces of information $((X_{B16}) \times (Y_1)$ and $(X_{B15}) \times (Y_0))$. The synchronization information generation section 225 designates the information as the synchronization information for the second user apparatus 100.

The synchronization information for the first user apparatus 100 is transmitted to the first user apparatus 100 of the two user apparatuses 100 as the specified user apparatuses, and the synchronization information for the second user apparatus 100 is transmitted to the second user apparatus 100 of the two user apparatuses 100 as the specified user apparatuses.

The first user apparatus 100 having received the synchronization information generates initial solutions as described below.

As in the first modification, the synchronization information is transmitted to the user initial solution generation section 125 in the first user apparatus 100. The user initial solution generation section 125 having received the synchronization information generates initial solutions used for the two user apparatuses 100 as the specified user apparatuses to perform encrypted communication. To this end, the user initial solution generation section 125 transmits an instruction to generate a solution to the user solution generation section 123. The user solution generation section 123 generates a solution. As repeatedly described above, the user solution generation section 123 in the first user apparatus 100 can generate solutions synchronized with solutions generated by the server solution generation section 223 in the server 200. In this example, the user solution generation section 123 can generate two solutions $(X_{A5})$ and $(X_{A4})$, which are solutions generated by the synchronization information generation section 225 in the server 200 as solutions that can be generated by the first user apparatus 100 when generating the synchronization information. The condition for what number solution is to be generated is shared in advance between the server 200 and the user apparatus 100, for example.

The user solution generation section 123 transmits the generated two solutions to the user initial solution generation section 125. Using the two solutions $(X_{A5})$ and $(X_{A4})$, the user initial solution generation section 125 performs a reverse operation, which is reverse to the operation performed in the synchronization information generation section 225 in the server 200, on the synchronization information transmitted from the server 200. Specifically, reverse operations $(X_{A5}) \times (Y_1)/(X_{A5})$ and $(X_{A4}) \times (Y_0)/(X_{A4})$ are performed. As a result, the user initial solution generation section 125 obtains a pair of solutions $((Y_1), (Y_0))$.

The user initial solution generation section 125 designates the pair of solutions as initial solutions and stores the solutions in the user solution recording section 124.

The second user apparatus 100 having received the synchronization information performs the same process to generate initial solutions.

The synchronization information is transmitted to the user initial solution generation section 125 in the second user apparatus 100. The user initial solution generation section 125 transmits an instruction to generate a solution to the user solution generation section 123. The user solution generation section 123 generates a solution. The user solution generation section 123 can generate two solutions $(X_{B16})$ and $(X_{B15})$, which are solutions generated by the synchronization information generation section 225 in the server 200 as solutions that can be generated by the second user apparatus 100 when generating the synchronization information.

The user solution generation section 123 transmits the generated two solutions to the user initial solution generation section 125. Using the two solutions $(X_{B16})$ and $(X_{B15})$, the user initial solution generation section 125 performs a reverse operation, which is reverse to the operation performed in the synchronization information generation section 225 in the server 200, on the synchronization information transmitted from the server 200. Specifically, reverse operations $(X_{B16}) \times (Y_1)/(X_{B16})$ and $(X_{B15}) \times (Y_0)/(X_{B15})$ are performed. As a result, the user initial solution generation section 125 obtains a pair of solutions $((Y_1), (Y_0))$.

The user initial solution generation section 125 designates the pair of solutions as initial solutions and stores the solutions in the user solution recording section 124.

In this way, the same initial solutions are shared by the two user apparatuses 100 as the specified user apparatuses.

After that, the two user apparatuses 100 as the specified user apparatuses can generate synchronized solutions based on the common initial solutions described above to perform encrypted communication, as in the first modification or the first embodiment.

Second Embodiment

A communication system according to a second embodiment will be described.

The communication system according to the second embodiment is generally based on the communication system according to the first embodiment and incorporates the communication system according to the first embodiment.

Figure 7:
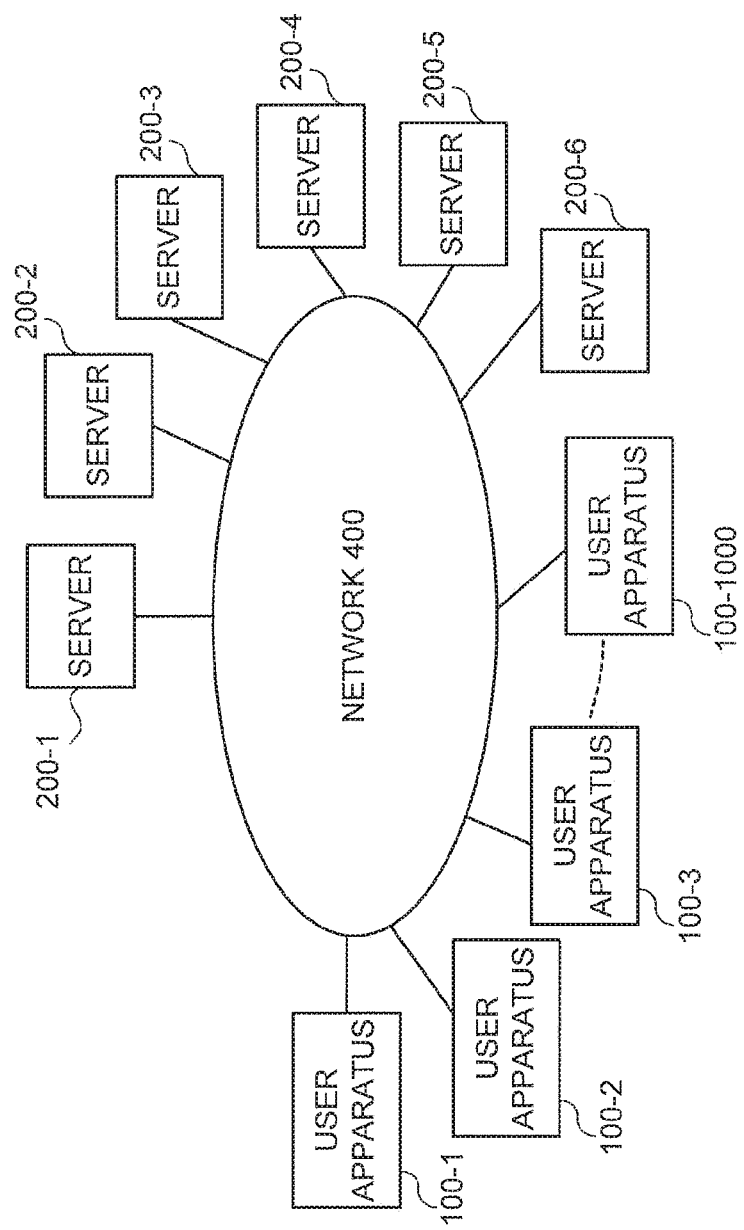
FIG. 7 is a diagram showing a general configuration of a communication system according to a second embodiment.

FIG. 7 is a schematic diagram showing the communication system according to the second embodiment.

The communication system according to the second embodiment includes user apparatuses 100 and servers 200. Specifically, the communication system includes 1000 user apparatuses 100-1 to 100-1000 and six servers 200-1 to 200-6.

The user apparatus 100 can have the same configuration as the user apparatus according to the first embodiment and the modifications thereof. The same holds true for the servers 200-1 to 200-4 of the servers 200. Of the servers 200, those described below can perform encrypted communication therebetween.

In the second embodiment, without limitation, the server 200-1 manages the user apparatuses 100-1 to 100-300 in the sense described above with regard to the first embodiment. That is, the server 200-1 can generate a solution synchronized with solutions generated by all of the user apparatuses 100-1 to 100-300. Furthermore, when any two user apparatuses 100 of the user apparatuses 100-1 to 100-300 perform the encrypted communication described above with regard to the first embodiment therebetween as specified user apparatuses, the server 200-1 can provide synchronization information to the two user apparatuses 100. In other words, the user apparatuses 100-1 to 100-300 managed by the server 200-1 can perform the encrypted communication described above with regard to the first embodiment (or the first to fourth modifications) under the control of the server 200-1.

Similarly, the server 200-2 manages the user apparatuses 100-301 to 100-600 in the sense described above with regard to the first embodiment, the server 200-3 manages the user apparatuses 100-601 to 100-900 in the sense described above with regard to the first embodiment, and the server 200-4 manages the user apparatuses 100-901 to 100-1000 in the sense described above with regard to the first embodiment.

The servers 200-1 and 200-2 can perform encrypted communication therebetween. The encrypted communication may or may not be the encrypted communication described above with regard to the first embodiment or the like that is performed between two user apparatuses 100 as specified user apparatuses using solutions generated in synchronization.

The servers 200-5 and 200-6 do not manage any user apparatus 100 in the sense described above with regard to the first embodiment. However, the server 200-5 can perform encrypted communication with the servers 200-1 and 200-3, and the server 200-6 can perform encrypted communication with the servers 200-1 and 200-4. The encrypted communication between the server 200-5 and the server 200-1 or 200-3 and the encrypted communication between the server 200-6 and the server 200-1 or 200-4 may or may not be the encrypted communication described above with regard to the first embodiment or the like that is performed between two user apparatuses 100 as specified user apparatuses using solutions generated in synchronization.

Figure 8:
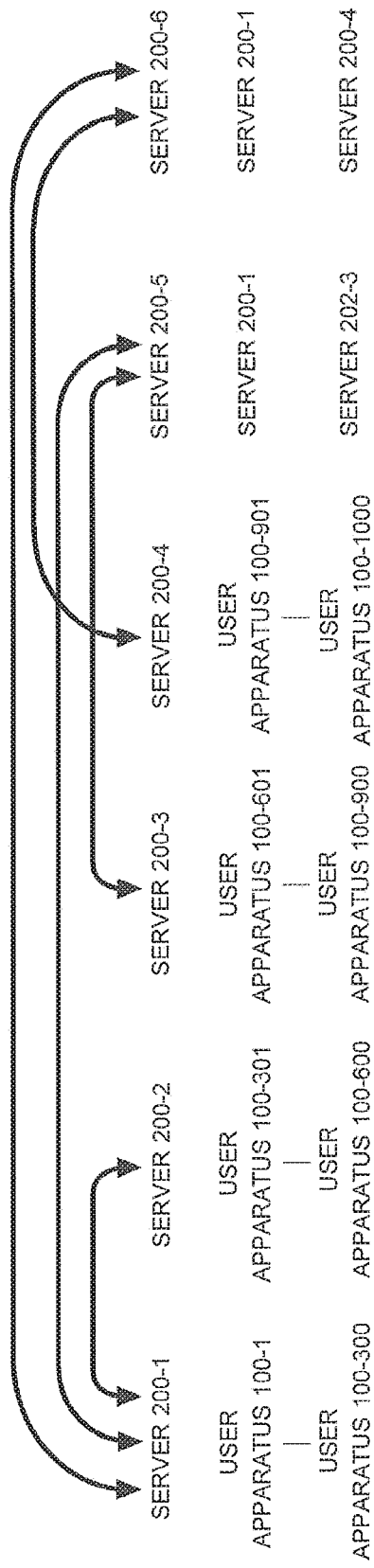
FIG. 8 is a conceptual diagram showing relationships between servers and user apparatuses in the communication system shown in FIG. 7.

FIG. 8 shows what has been described above. In FIG. 8, the network 400 is not shown.

In the communication system described above, of course, any two user apparatuses 100 as specified user apparatuses managed by a common server 200 can obtain synchronization information from the server 200 under the control of the common managing server 200, and can use the synchronization information to perform the encrypted communication described above with regard to the first embodiment or the like that is performed between two user apparatuses 100 as specified user apparatuses using solutions generated in synchronization.

For example, of the user apparatuses 100-1 to 100-300 managed by the server 200-1, two user apparatuses 100-2 and 100-105 can perform the encrypted communication using solutions generated in synchronization. As another example, of the user apparatuses managed by the server 200-2, the user apparatuses 100-451 and 100-501 can perform the encrypted communication using solutions generated in synchronization.

Furthermore, in the communication system according to the second embodiment, any two user apparatuses 100 that are not managed by a common server 200 can perform the encrypted communication using solutions generated in synchronization, if the servers 200 managing the user apparatuses can directly perform the encrypted communication therebetween or indirectly perform the encryption communication therebetween via another server 200.

For example, it is supposed that the user apparatus 100-1 managed by the server 200-1 and the user apparatus 100-390 managed by the server 200-2 are selected as specified user apparatuses, and the user apparatuses 100-1 and 100-390 wish to perform the encrypted communication using solutions generated in synchronization. In this case, for example, the user apparatus 100-1 transmits the specification information similar to that described above with regard to the first embodiment, that is, the specification information that specifies the user apparatuses 100-1 and 100-390, to the server 200-1 that manages the user apparatus 100-1.

Upon receiving the specification information, the server 200-1 searches the other servers 200 for a server 200 that manages the user apparatus 100-390, which is not managed by the server 200-1. For example, the server 200-1 transmits a notification that the server 200-1 is searching for such a server 200 to the other servers 200. Then, the server 200-1 finds the server 200-2 as a server 200 that manages the user apparatuses 100-390 by receiving a notification from the server 200-2, for example.

As described above, the servers 200-1 and 200-2 can perform encrypted communication therebetween. This may mean that a relationship of trust has already been built between the servers 200-1 and 200-2 or managers thereof, allowing them to perform encrypted communication therebetween. The servers 200-1 and 200-2 perform encrypted communication therebetween. The encrypted communication is exchange of information used for generating the synchronization information described above with regard to the first embodiment between the servers 200-1 and 200-2.

What is essential for generating the synchronization information is a solution synchronized with solutions generated by the two user apparatuses 100 as specified user apparatuses, and such a solution can be generated by any of the servers 200-1 and 200-2 that manage the two user apparatuses 100-1 and 100-390 as specified user apparatuses, respectively. Furthermore, in order to generate a solution required to generate the synchronization information, specification information that indicates which user apparatus 100 is a specified user apparatus. In this regard, the server 200-1 has already had the specification information, so that the servers 200-1 and 200-2 can share the specification information by the server 200-1 transmitting the server 200-2 through the encrypted communication. In some cases (such as the modification 2 or 4), a solution that is not synchronized with any solution generated in the two user apparatuses 100 as specified user apparatuses is used as an initial solution in the two user apparatuses as specified user apparatuses. In such cases, such a solution can be generated by any server 200. Therefore, if the servers 200-1 and 200-2 transmit and receive solutions, specification information or the like that can be generated by the user apparatuses 100 managed by the servers, at least one of the servers 200-1 and 200-2 can generate the synchronization information described above with regard to the first embodiment.

The generated synchronization information needs to be transmitted to at least one of the user apparatuses 100-1 and 100-390. The server 200-1 can transmit the synchronization information to the user apparatus 100-1, and the server 200-2 can transmit the synchronization information to the user apparatus 100-390.

Figure 9:
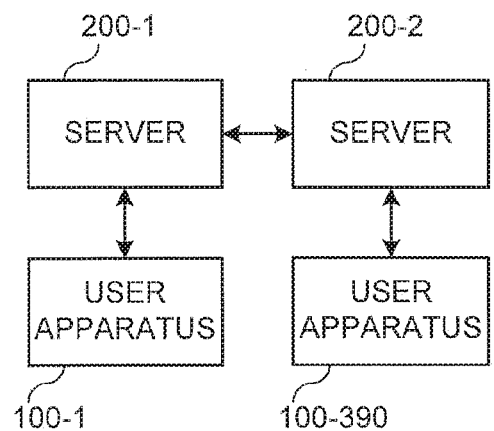
FIG. 9 is a conceptual diagram showing an example communication established for a server to provide synchronization information to a user apparatus in the communication system shown in FIG. 7.

That is, in the case described above, the servers 200-1 and 200-2 performing encrypted communication therebetween cooperate to function as what is referred to as the "server 200" in the first embodiment for all the user apparatuses 100 managed by at least one of the servers 200-1 and 200-2, and the servers 200-1 and 200-2 each function as what is referred to as a sub-server apparatus in the present invention. FIG. 9 is a conceptual diagram showing the communication described above. In FIG. 9, the network 400 is not shown.

Similarly, for example, it is supposed that a user apparatus 100 managed by the server 200-1, such as a user apparatus 100-90, and a user apparatus 100 managed by the server 200-3, such as a user apparatus 100-800, are selected as specified user apparatuses, and the user apparatuses wish to perform encrypted communication using solutions generated in synchronization. For example, the user apparatus 100-90 transmits specification information similar to that described above with regard to the first embodiment, that is, specification information that specifies the user apparatuses 100-90 and 100-800 to the server 200-1 that manages the user apparatus 100-90.

Upon receiving the specification information, the server 200-1 searches the other servers 200 for a server 200 that manages the user apparatus 100-800, which is not managed by the server 200-1. Then, the server 200-1 finds the server 200-3 that manages the user apparatus 100-800. However, the servers 200-1 and 200-3 cannot perform encrypted communication therebetween. This may mean that the servers 200-1 and 200-3 or managers thereof do not know each other, and a relationship of trust that allows the servers 200-1 and 200-3 to perform encrypted communication has not been built therebetween yet. In such a case, the server 200-1 searches for another server that can link the servers 200-1 and 200-3 to each other by encrypted communication. Fortunately, as described above, there is the server 200-5 as a server 200 that can link the servers 200-1 and 200-3 to each other by encrypted communication.

Figure 10:
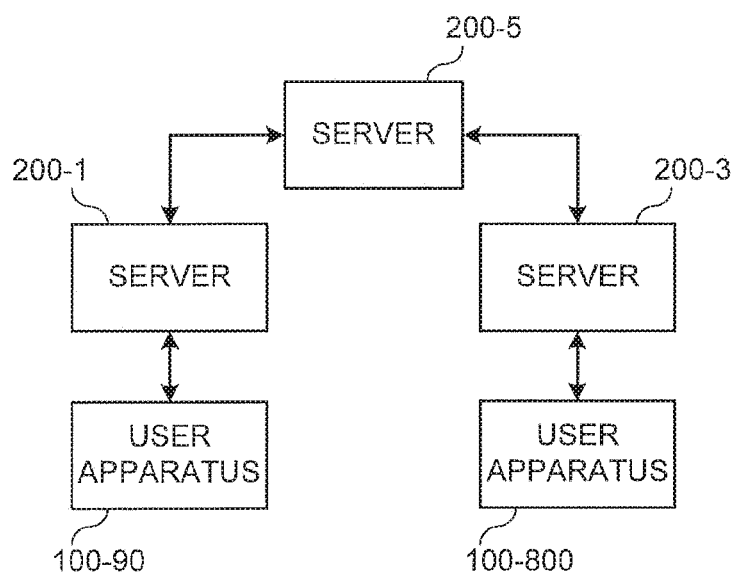
FIG. 10 is a conceptual diagram showing another communication established for a server to provide synchronization information to a user apparatus in the communication system shown in FIG. 7.

The servers 200-1 and 200-3 establish a communication via the server 200-5 as shown in FIG. 10. As with the servers 200-1 and 200-2, which can share information required to generate synchronization information, which allows the two user apparatuses 100 as specified user apparatuses to share initial solutions, the servers 200-1, 200-5 and 200-3 can share such information via the server 200-5. Then, any of the servers 200-1, 200-5 and 200-3 can generate the synchronization information.

The generated synchronization information needs to be transmitted to at least one of the user apparatuses 100-90 and 100-800. The server 200-1 can transmit the synchronization information to the user apparatus 100-90, and the server 200-3 can transmit the synchronization information to the user apparatus 100-800.

That is, in the case described above, the servers 200-1, 200-5 and 200-3 performing encrypted communication therebetween cooperate to function as what is referred to as the "server 200" in the first embodiment for all the user apparatuses 100 managed by at least one of the servers 200-1 and 200-3. In this case, the servers 200-1, 200-5 and 200-3 each function as what is referred to as a sub-server apparatus in the present invention. Among the sub-server apparatuses, there may be a server that manages no user apparatus 100, such as the server 200-5. The sub-user apparatus that manages no user apparatus 100 is to connect the servers 200 that manage user apparatuses 100 by encrypted communication and is likely to be more public than the servers 200 that manage user apparatuses 100.

Similarly, for example, it is supposed that a user apparatus 100 managed by the server 200-3, such as a user apparatus 100-700, and a user apparatus 100 managed by the server 200-4, such as a user apparatus 100-999, are selected as specified user apparatuses, and the user apparatuses wish to perform encrypted communication using solutions generated in synchronization. For example, the user apparatus 100-700 transmits specification information similar to that described above with regard to the first embodiment, that is, specification information that specifies the user apparatuses 100-700 and 100-999 to the server 200-3 that manages the user apparatus 100-700.

Upon receiving the specification information, the server 200-3 searches the other servers 200 for a server 200 that manages the user apparatus 100-999, which is not managed by the server 200-3. Then, the server 200-3 finds the server 200-4 that manages the user apparatus 100-999. However, the servers 200-3 and 200-4 cannot perform encrypted communication therebetween. Furthermore, there is not a server that can directly link the servers 200-3 and 200-4 to each other by encrypted communication. However, the server 200-5 can perform encrypted communication with the server 200-3, the server 200-6 can perform encrypted communication with the server 200-4, and both the servers 200-5 and 200-6 can perform encrypted communication with the server 200-1.

Figure 11:
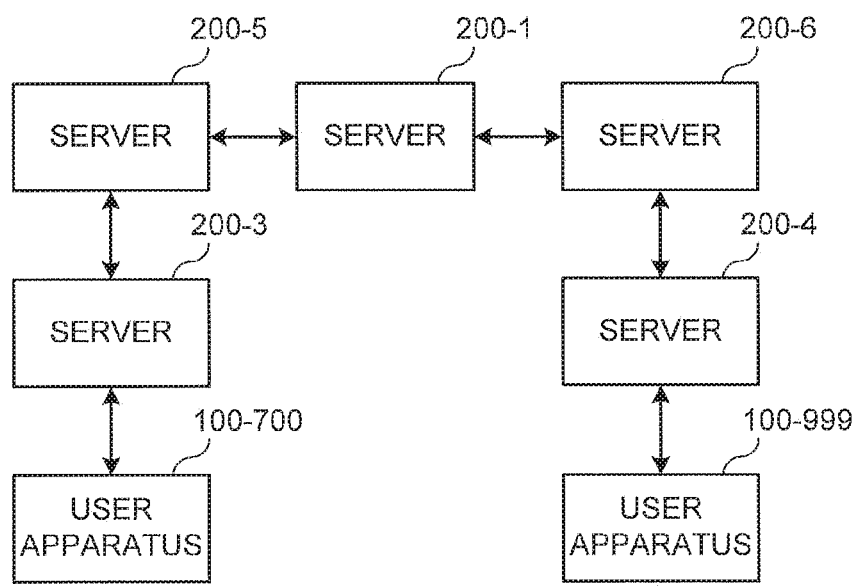
FIG. 11 is a conceptual diagram showing another communication established for a server to provide synchronization information to a user apparatus in the communication system shown in FIG. 7.

Therefore, the servers 200-3 and 200-4 can establish a communication via the servers 200-5, 200-1 and 200-6 as shown in FIG. 11. As with the servers 200-1 and 200-2, which can share information required to generate synchronization information, which allows the two user apparatuses 100 as specified user apparatuses to share initial solutions, the servers 200-3, 200-5, 200-1, 200-6 and 200-4 can share such information via the servers 200-5, 200-1 and 200-6. Then, any of the servers 200-3, 200-5, 200-1, 200-6 and 200-4 can generate the synchronization information via the servers 200-5, 200-1 and 200-6.

The generated synchronization information needs to be transmitted to at least one of the user apparatuses 100-700 and 100-999. The server 200-3 can transmit the synchronization information to the user apparatus 100-700, and the server 200-4 can transmit the synchronization information to the user apparatus 100-999.

That is, in the case described above, the servers 200-3, 200-5, 200-1, 200-6 and 200-4 performing encrypted communication therebetween cooperate to function as what is referred to as the "server 200" in the first embodiment for all the user apparatuses 100 managed by at least one of the servers 200-3 and 200-4. In this case, the servers 200-3, 200-5, 200-1, 200-6 and 200-4 each function as what is referred to as a sub-server apparatus in the present invention. As described above, among the sub-server apparatuses, there may be a server that manages no user apparatus 100, such as the servers 200-5 and 200-6. Furthermore, a server 200 (the server 200-1, in this example) that does not manage the user apparatuses 100 included in the specified user apparatuses but manages a user apparatus 100 that is not included in the specified user apparatuses may intervene between two servers 200 (the servers 200-3 and 200-4, in this example) that manage the two user apparatuses 100 as the specified user apparatuses and help establishing the encrypted communication between the two servers 200 that manage the two user apparatuses 100 as the specified user apparatuses.

As described above, an aggregate of sub-servers 200 that has the same function as the server 200 in the first embodiment is formed by combining sub-servers 200 performing encrypted communication, thereby allowing user apparatuses 100 managed by different sub-servers 200 to share initial solutions and thus to perform encrypted communication using successively generated synchronized solutions.

For example, in the example shown in FIG. 7, any two user apparatuses 100 selected from among the user apparatuses 100-1 to 100-1000 can share initial solutions via at least one server 200 and perform encrypted communication using successively generated synchronized solutions.

The invention claimed is:
1. A communication system comprising a large number of user apparatuses configured to communicate with each other via a network and a server apparatus that is connected to the network and controls communication between the user apparatuses,
wherein each of the user apparatuses has one or more processors; and
memory communicatively coupled to the one or more processors, the memory storing computer-executable means executable by the one or more processors, the computer-executable means including:
user solution generation means configured to successively generate solutions based on an initial solution, the generated solution being a string of a predetermined number of characters of at least one type selected from among letters, numerals and symbols, and a same solution being always generated under a same condition;
user encryption means that performs a processing of encrypting transmission data, which is to be transmitted, into encrypted data using the solution generated by the user solution generation means;
user transmission means that transmits the encrypted data to another apparatus;
user reception means that receives the encrypted data from another apparatus; and
user decryption means that performs a processing of decrypting the received encrypted data using the solution generated by the user solution generation means into the transmission data,
each of the user apparatuses is configured so that, if specified user apparatuses, which are two user apparatuses that are to perform encrypted communication, have a common initial solution, the specified user apparatuses are configured to support encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses,
each of the user apparatuses is configured to transmit specification information, which is information that specifies both the specified user apparatuses, to the server apparatus from the user transmission means thereof, and
the server apparatus comprises one or more processors; and
memory communicatively coupled to the one or more processors, the memory storing computer-executable means executable by the one or more processors, the computer-executable means including:
server reception means that receives the specification information from one of the specified user apparatuses;
server solution generation means configured to generate solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses;
synchronization information generation means that generates synchronization information, which is information required for the specified user apparatuses that obtain the same initial solution to synchronize the solutions between the specified user apparatuses, using the solution generated by the server solution generation means; and
server transmission means that transmits the synchronization information to at least one of the specified user apparatuses,
wherein the server apparatus is configured to transmit, as the synchronization information, information derived by performing a reversible operation on both a solution used as the initial solution that is configured to generate by the user solution generation means in one of the specified user apparatuses and a solution used as the initial solution that is configured to generate by the user solution generation means in the other of the specified user apparatuses to any of the user apparatuses as the specified user apparatuses, the user apparatuses of the specified user apparatuses that does not receive the synchronization information is configured to designates a new solution generated by the user solution generation means under a predetermined condition as an initial solution, and the user apparatus of the specified user apparatuses that receives the synchronization information transmitted from the server apparatus is configured to perform a reverse operation that is reverse to the reversible operation on the synchronization information using a new solution generated by the user solution generation means to derive from the synchronization information a solution that is common to the solution generated in the user apparatus that does not receive the synchronization information and designate the derived solution as an initial solution, thereby allowing synchronization of the solutions between the specified user apparatuses.

2. A server apparatus that forms a communication system in cooperation with a large number of user apparatuses, the communication system including the large number of user apparatuses and the server apparatus, the user apparatuses being configured to communicate with each other via a network, and the server apparatus being connected to the network and controlling communication between the user apparatuses, wherein each of the user apparatuses has one or more processors; and memory communicatively coupled to the one or more processors, the memory storing computer-executable means executable by the one or more processors, the computer-executable means including:

user solution generation means configured to successively generate solutions based on an initial solution, the generated solution being a string of a predetermined number of characters of at least one type selected from among letters, numerals and symbols, and a same solution being always generated under a same condition;

user encryption means that performs a processing of encrypting transmission data, which is to be transmitted, into encrypted data using the solution generated by the user solution generation means;

user transmission means that transmits the encrypted data to another apparatus;

user reception means that receives the encrypted data from another apparatus; and user decryption means that performs a processing of decrypting the received encrypted data using the solution generated by the user solution generation means into the transmission data, each of the user apparatuses is configured so that, if specified user apparatuses, which are two user apparatuses that are to perform encrypted communication, have a common initial solution, the specified user apparatuses are configured to support encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses, each of the user apparatuses is configured to transmit specification information, which is information that specifies both the specified user apparatuses, to the server apparatus from the user transmission means thereof, and the server apparatus comprises one or more processors; and memory communicatively coupled to the one or more processors, the memory storing computer-executable means executable by the one or more processors, the computer-executable means including:

server reception means that receives the specification information from one of the specified user apparatuses;

server solution generation means configured to generate solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses;

synchronization information generation means that generates synchronization information, which is information required for the specified user apparatuses that obtain the same initial solution to synchronize the solutions between the specified user apparatuses, using the solution generated by the server solution generation means; and server transmission means that transmits the synchronization information to at least one of the specified user apparatuses, wherein the server apparatus is configured to transmit, as the synchronization information, information derived by performing a reversible operation on both a solution used as the initial solution that is configured to generate by the user solution generation means in one of the specified user apparatuses and a solution used as the initial solution that is configured to generate by the user solution generation means in the other of the specified user apparatuses to any of the user apparatuses as the specified user apparatuses, the user apparatuses of the specified user apparatuses that does not receive the synchronization information is configured to designates a new solution generated by the user solution generation means under a predetermined condition as an initial solution, and the user apparatus of the specified user apparatuses that receives the synchronization information transmitted from the server apparatus is configured to perform a reverse operation that is reverse to the reversible operation on the synchronization information using a new solution generated by the user solution generation means to derive from the synchronization information a solution that is common to the solution generated in the user apparatus that does not receive the synchronization information and designate the derived solution as an initial solution, thereby allowing synchronization of the solutions between the specified user apparatuses.

3. The server apparatus according to claim 2, wherein the server apparatus includes a plurality of sub-server apparatuses that are configured to generate an initial solution synchronized between at least a plurality of the user apparatuses and performing encrypted communication with each other via the network, and if the specified user apparatuses are configured to generate an initial solution synchronized with solutions generated by each of two sub-server apparatuses, the two sub-server apparatuses or a combination of the two sub-server apparatuses and another sub-server apparatus configured to support encrypted communication with both the two sub-server apparatuses cooperate with each other to provide the synchronization information generation means and the server transmission means.

4. The server apparatus according to claim 2, wherein the user apparatus is comprised of a computer apparatus,
wherein the computer apparatus comprises the user solution generation means, the user encryption means, the user decryption means and the means that generates the initial solution.

5. A user apparatus that forms the communication system in corporation with the server apparatus according to claim 2, wherein the user apparatus is configured to perform:
a step of the user transmission means transmitting specification information, which is information that specifies both the specified user apparatuses, to the server apparatus, and
a step of generating the initial solution using the specification information when receiving the synchronization information.

6. A server apparatus that forms a communication system in cooperation with a large number of user apparatuses, the communication system including the large number of user apparatuses and the server apparatus, the user apparatuses being configured to communicate with each other via a network, and the server apparatus being connected to the network and controlling communication between the user apparatuses,
wherein each of the user apparatuses has one or more processors; and
memory communicatively coupled to the one or more processors, the memory storing computer-executable means executable by the one or more processors, the computer-executable means including:
user solution generation means configured to successively generate solutions based on an initial solution, the generated solution being a string of a predetermined number of characters of at least one type selected from among letters, numerals and symbols, and a same solution being always generated under a same condition;
user encryption means that performs a processing of encrypting transmission data, which is to be transmitted, into encrypted data using the solution generated by the user solution generation means;
user transmission means that transmits the encrypted data to another apparatus;
user reception means that receives the encrypted data from another apparatus; and
user decryption means that performs a processing of decrypting the received encrypted data using the solution generated by the user solution generation means into the transmission data,
each of the user apparatuses is configured so that, if specified user apparatuses, which are two user apparatuses that are to perform encrypted communication, have a common initial solution, the specified user apparatuses are configured to support encrypted communication by the user solution generation means in each of the two user apparatuses generating common solutions synchronized between the two apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses,
each of the user apparatuses is configured to transmit specification information, which is information that specifies both the specified user apparatuses, to the server apparatus from the user transmission means thereof, and
the server apparatus comprises one or more processors; and
memory communicatively coupled to the one or more processors, the memory storing computer-executable means executable by the one or more processors, the computer-executable means including:
server reception means that receives the specification information from one of the specified user apparatuses;
server solution generation means configured to generate solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses;
synchronization information generation means that generates synchronization information, which is information required for the specified user apparatuses that obtain the same initial solution to synchronize the solutions between the specified user apparatuses, using the solution generated by the server solution generation means; and
server transmission means that transmits the synchronization information to at least one of the specified user apparatuses,
wherein at least one of the user apparatuses further comprises means that generates the initial solution using the specification information when receiving the synchronization information from the server apparatus,
wherein the server apparatus is configured to transmit, as the synchronization information, information derived by performing a reversible operation on both a solution used as the initial solution that is configured to generate by the user solution generation means in one of the specified user apparatuses and a solution used as the initial solution that is configured to generate by the user solution generation means in the other of the specified user apparatuses to any of the user apparatuses as the specified user apparatuses,
the user apparatuses of the specified user apparatuses that does not receive the synchronization information is configured to designates a new solution generated by the user solution generation means under a predetermined condition as an initial solution, and the user apparatus of the specified user apparatuses that receives the synchronization information transmitted from the server apparatus is configured to perform a reverse operation that is reverse to the reversible operation on the synchronization information using a new solution generated by the user solution generation means to derive from the synchronization information a solution that is common to the solution generated in the user apparatus that does not receive the synchronization information and designate the derived solution as an initial solution, thereby allowing synchronization of the solutions between the specified user apparatuses.

7. A method performed in a server apparatus that forms a communication system in cooperation with a large number of user apparatuses, the communication system comprising the large number of user apparatuses and the server apparatus, the user apparatuses configured to communicate with each other via a network, and the server apparatus being connected to the network and controlling communication between the user apparatuses,
  wherein each of the user apparatuses has one or more processors; and
  memory communicatively coupled to the one or more processors, the memory storing computer-executable means executable by the one or more processors, the computer-executable means including:
  user solution generation means configured to successively generate solutions based on an initial solution, the generated solution being a string of a predetermined number of characters of at least one type selected from among letters, numerals and symbols, and a same solution being always generated under a same condition;
  user encryption means that performs a processing of encrypting transmission data, which is to be transmitted, into encrypted data using the solution generated by the user solution generation means;
  user transmission means that transmits the encrypted data to another apparatus;
  user reception means that receives the encrypted data from another apparatus; and
  user decryption means that performs a processing of decrypting the received encrypted data using the solution generated by the user solution generation means into the transmission data,
  each of the user apparatuses is configured so that, if specified user apparatuses, which are two user apparatuses that are to perform encrypted communication, have a common initial solution, the specified user apparatuses are configured to support encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses,
  each of the user apparatuses is configured to transmit specification information, which is information that specifies both the specified user apparatuses, to the server apparatus from the user transmission means thereof, and
  the method comprises steps performed by the server apparatus that comprises one or more processors; and memory communicatively coupled to the one or more processors, the memory storing computer-executable means executable by the one or more processors, the computer-executable means including: server solution generation means configured to generate solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses, and the steps including:
  a step of receiving the specification information from one of the specified user apparatuses;
  a step of generating synchronization information, which is information required for the specified user apparatuses that obtain the same initial solution to synchronize the solutions between the specified user apparatuses, using the solution generated by the server solution generation means; and
  a step of transmitting the synchronization information to at least one of the specified user apparatuses,
  wherein the server apparatus is configured to transmit, as the synchronization information, information derived by performing a reversible operation on both a solution used as the initial solution that is configured to generate by the user solution generation means in one of the specified user apparatuses and a solution used as the initial solution that is configured to generate by the user solution generation means in the other of the specified user apparatuses to any of the user apparatuses as the specified user apparatuses,
  the user apparatuses of the specified user apparatuses that does not receive the synchronization information is configured to designates a new solution generated by the user solution generation means under a predetermined condition as an initial solution, and the user apparatus of the specified user apparatuses that receives the synchronization information transmitted from the server apparatus is configured to perform a reverse operation that is reverse to the reversible operation on the synchronization information using a new solution generated by the user solution generation means to derive from the synchronization information a solution that is common to the solution generated in the user apparatus that does not receive the synchronization information and designate the derived solution as an initial solution, thereby
  allowing synchronization of the solutions between the specified user apparatuses.

8. One or more non-transitory computer readable storage media encoded with instructions that, when executed by a processor, cause the a computer to function as a server apparatus that forms a communication system in cooperation with a large number of user apparatuses, the communication system including the large number of user apparatuses and the server apparatus, the user apparatuses being configured to communicate with each other via a network, and the server apparatus being connected to the network and controlling communication between the user apparatuses,
  wherein each of the user apparatuses has:
  user solution generation means configured to successively generate solutions based on an initial solution, the generated solution being a string of a predetermined number of characters of at least one type selected from among letters, numerals and symbols, and a same solution being always generated under a same condition;
  user encryption means that performs a processing of encrypting transmission data, which is to be transmitted, into encrypted data using the solution generated by the user solution generation means;
  user transmission means that transmits the encrypted data to another apparatus;
  user reception means that receives the encrypted data from another apparatus; and user decryption means that performs a processing of decrypting the received encrypted data using the solution generated by the user solution generation means into the transmission data, each of the user apparatuses is configured so that, if specified user apparatuses, which are two user apparatuses that are to perform encrypted communication, have a common initial solution, the specified user apparatuses are configured to support encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses, each of the user apparatuses is configured to transmit specification information, which is information that specifies both the specified user apparatuses, to the server apparatus from the user transmission means thereof, and the instructions further cause the computer to function as:

server reception means that receives the specification information from one of the specified user apparatuses;

server solution generation means configured to generate solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses;

synchronization information generation means that generates synchronization information, which is information required for the specified user apparatuses that obtain the same initial solution to synchronize the solutions between the specified user apparatuses, using the solution generated by the server solution generation means; and server transmission means that transmits the synchronization information to at least one of the specified user apparatuses, wherein the server apparatus is configured to transmit, as the synchronization information, information derived by performing a reversible operation on both a solution used as the initial solution that is configured to generate by the user solution generation means in one of the specified user apparatuses and a solution used as the initial solution that is configured to generate by the user solution generation means in the other of the specified user apparatuses to any of the user apparatuses as the specified user apparatuses, the user apparatuses of the specified user apparatuses that does not receive the synchronization information is configured to designates a new solution generated by the user solution generation means under a predetermined condition as an initial solution, and the user apparatus of the specified user apparatuses that receives the synchronization information transmitted from the server apparatus is configured to perform a reverse operation that is reverse to the reversible operation on the synchronization information using a new solution generated by the user solution generation means to derive from the synchronization information a solution that is common to the solution generated in the user apparatus that does not receive the synchronization information and designate the derived solution as an initial solution, thereby allowing synchronization of the solutions between the specified user apparatuses.

9. A communication system comprising a large number of user apparatuses configured to communicate with each other via a network and a server apparatus that is connected to the network and controls communication between the user apparatuses, wherein each of the user apparatuses has one or more processors; and memory communicatively coupled to the one or more processors, the memory storing computer-executable means executable by the one or more processors, the computer-executable means including:

user solution generation means configured to successively generate solutions based on an initial solution, the generated solution being a string of a predetermined number of characters of at least one type selected from among letters, numerals and symbols, and a same solution being always generated under a same condition;

user encryption means that performs a processing of encrypting transmission data, which is to be transmitted, into encrypted data using the solution generated by the user solution generation means;

user transmission means that transmits the encrypted data to another apparatus;

user reception means that receives the encrypted data from another apparatus; and user decryption means that performs a processing of decrypting the received encrypted data using the solution generated by the user solution generation means into the transmission data, each of the user apparatuses is configured so that, if specified user apparatuses, which are two user apparatuses that are to perform encrypted communication, have a common initial solution, the specified user apparatuses are configured to support encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses, each of the user apparatuses is configured to transmit specification information, which is information that specifies both the specified user apparatuses, to the server apparatus from the user transmission means thereof, and the server apparatus comprises one or more processors; and memory communicatively coupled to the one or more processors, the memory storing computer-executable means executable by the one or more processors, the computer-executable means including:

server reception means that receives the specification information from one of the specified user apparatuses;

server solution generation means configured to generate solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses;

synchronization information generation means that generates synchronization information, which is information required for the specified user apparatuses that obtain the same initial solution to synchronize the solutions between the specified user apparatuses, using the solution generated by the server solution generation means; and server transmission means that transmits the synchronization information to at least one of the specified user apparatuses, wherein the server apparatus is configured to transmit first information derived by performing a reversible operation on both a solution used as the initial solution and a solution that is configured to be generated by the user solution generation means in one of the specified user apparatuses as the synchronization information to the one of the specified user apparatuses, and transmit second information derived by performing a reversible operation on both the solution used as the initial solution and a solution that is configured to be generated by the user solution generation means in the other of the specified user apparatuses as the synchronization information to the other of the specified user apparatuses, and the one of the specified user apparatuses is configured to perform a reverse operation that is reverse to the reversible operation on the synchronization information transmitted from the server apparatus using a new solution generated by the user solution generation means to derive a solution from the synchronization information, which is the first information, and designate the derived solution as an initial solution, the other of the specified user apparatuses is configured to perform a reverse operation that is reverse to the reversible operation on the synchronization information transmitted from the server apparatus using a new solution generated by the user solution generation means to derive a solution that is common to the solution generated in the one of the specified user apparatuses from the synchronization information, which is the second information, and designate the derived solution as an initial solution, thereby allowing synchronization of the solutions between the user apparatuses.

10. A server apparatus that forms a communication system in cooperation with a large number of user apparatuses, the communication system including the large number of user apparatuses and the server apparatus, the user apparatuses being configured to communicate with each other via a network, and the server apparatus being connected to the network and controlling communication between the user apparatuses, wherein each of the user apparatuses has one or more processors; and memory communicatively coupled to the one or more processors, the memory storing computer-executable means executable by the one or more processors, the computer-executable means including:

user solution generation means configured to successively generate solutions based on an initial solution, the generated solution being a string of a predetermined number of characters of at least one type selected from among letters, numerals and symbols, and a same solution being always generated under a same condition;

user encryption means that performs a processing of encrypting transmission data, which is to be transmitted, into encrypted data using the solution generated by the user solution generation means;

user transmission means that transmits the encrypted data to another apparatus;

user reception means that receives the encrypted data from another apparatus; and user decryption means that performs a processing of decrypting the received encrypted data using the solution generated by the user solution generation means into the transmission data, each of the user apparatuses is configured so that, if specified user apparatuses, which are two user apparatuses that are to perform encrypted communication, have a common initial solution, the specified user apparatuses are configured to support encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses, each of the user apparatuses is configured to transmit specification information, which is information that specifies both the specified user apparatuses, to the server apparatus from the user transmission means thereof, and the server apparatus comprises one or more processors; and memory communicatively coupled to the one or more processors, the memory storing computer-executable means executable by the one or more processors, the computer-executable means including:

server reception means that receives the specification information from one of the specified user apparatuses;

server solution generation means configured to generate solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses;

synchronization information generation means that generates synchronization information, which is information required for the specified user apparatuses that obtain the same initial solution to synchronize the solutions between the specified user apparatuses, using the solution generated by the server solution generation means; and server transmission means that transmits the synchronization information to at least one of the specified user apparatuses, wherein the server apparatus is configured to transmit first information derived by performing a reversible operation on both a solution used as the initial solution and a solution that is configured to be generated by the user solution generation means in one of the specified user apparatuses as the synchronization information to the one of the specified user apparatuses, and transmit second information derived by performing a reversible operation on both the solution used as the initial solution and a solution that is configured to be generated by the user solution generation means in the other of the specified user apparatuses as the synchronization information to the other of the specified user apparatuses, and the one of the specified user apparatuses is configured to perform a reverse operation that is reverse to the reversible operation on the synchronization information transmitted from the server apparatus using a new solution generated by the user solution generation means to derive a solution from the synchronization information, which is the first information, and designate the derived solution as an initial solution, the other of the specified user apparatuses is configured to perform a reverse operation that is reverse to the reversible operation on the synchronization information transmitted from the server apparatus using a new solution generated by the user solution generation means to derive a solution that is common to the solution generated in the one of the specified user apparatuses from the synchronization information, which is the second information, and designate the derived solution as an initial solution, thereby allowing synchronization of the solutions between the user apparatuses.

11. A server apparatus that forms a communication system in cooperation with a large number of user apparatuses, the communication system including the large number of user apparatuses and the server apparatus, the user apparatuses being configured to communicate with each other via a network, and the server apparatus being connected to the network and controlling communication between the user apparatuses, wherein each of the user apparatuses has one or more processors; and memory communicatively coupled to the one or more processors, the memory storing computer-executable means executable by the one or more processors, the computer-executable means including:

user solution generation means configured to successively generate solutions based on an initial solution, the generated solution being a string of a predetermined number of characters of at least one type selected from among letters, numerals and symbols, and a same solution being always generated under a same condition;

user encryption means that performs a processing of encrypting transmission data, which is to be transmitted, into encrypted data using the solution generated by the user solution generation means;

user transmission means that transmits the encrypted data to another apparatus;

user reception means that receives the encrypted data from another apparatus; and user decryption means that performs a processing of decrypting the received encrypted data using the solution generated by the user solution generation means into the transmission data, each of the user apparatuses is configured so that, if specified user apparatuses, which are two user apparatuses that are to perform encrypted communication, have a common initial solution, the specified user apparatuses are configured to support encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses, each of the user apparatuses is configured to transmit specification information, which is information that specifies both the specified user apparatuses, to the server apparatus from the user transmission means thereof, and the server apparatus comprises one or more processors; and memory communicatively coupled to the one or more processors, the memory storing computer-executable means executable by the one or more processors, the computer-executable means including:

server reception means that receives the specification information from one of the specified user apparatuses;

server solution generation means configured to generate solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses;

synchronization information generation means that generates synchronization information, which is information required for the specified user apparatuses that obtain the same initial solution to synchronize the solutions between the specified user apparatuses, using the solution generated by the server solution generation means; and server transmission means that transmits the synchronization information to at least one of the specified user apparatuses, wherein the user apparatus has:

user solution generation means configured to successively generate solutions based on an initial solution, the generated solution being a string of a predetermined number of characters of at least one type selected from among letters, numerals and symbols, and a same solution being always generated under a same condition;

user encryption means that performs a processing of encrypting transmission data, which is to be transmitted, into encrypted data using the solution generated by the user solution generation means;

user transmission means that transmits the encrypted data to another apparatus;

user reception means that receives the encrypted data from another apparatus; and user decryption means that performs a processing of decrypting the received encrypted data using the solution generated by the user solution generation means into the transmission data, the user apparatus is configured so that, if specified user apparatuses, which are two user apparatuses that are to perform encrypted communication, have a common initial solution, the specified user apparatuses are configured to support encrypted communication by the user solution generation means in each of the two user apparatuses generating common solutions synchronized between the specified user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses, and the user apparatus further comprises means that generates the initial solution using the specification information when receiving the synchronization information from the server apparatus, wherein the server apparatus is configured to transmit first information derived by performing a reversible operation on both a solution used as the initial solution and a solution that is configured to be generated by the user solution generation means in one of the specified user apparatuses as the synchronization information to the one of the specified user apparatuses, and transmit second information derived by performing a reversible operation on both the solution used as the initial solution and a solution that is configured to be generated by the user solution generation means in the other of the specified user apparatuses as the synchronization information to the other of the specified user apparatuses, and the one of the specified user apparatuses is configured to perform a reverse operation that is reverse to the reversible operation on the synchronization information transmitted from the server apparatus using a new solution generated by the user solution generation means to derive a solution from the synchronization information, which is the first information, and designate the derived solution as an initial solution, the other of the specified user apparatuses is configured to perform a reverse operation that is reverse to the reversible operation on the synchronization information transmitted from the server apparatus using a new solution generated by the user solution generation means to derive a solution that is common to the solution generated in the one of the specified user apparatuses from the synchronization information, which is the second information, and designate the derived solution as an initial solution, thereby allowing synchronization of the solutions between the user apparatuses.

12. A method performed in a server apparatus that forms a communication system in cooperation with a large number of user apparatuses, the communication system comprising the large number of user apparatuses and the server apparatus, the user apparatuses configured to communicate with each other via a network, and the server apparatus being connected to the network and controlling communication between the user apparatuses, wherein each of the user apparatuses has one or more processors; and memory communicatively coupled to the one or more processors, the memory storing computer-executable means executable by the one or more processors, the computer-executable means including:

user solution generation means configured to successively generate solutions based on an initial solution, the generated solution being a string of a predetermined number of characters of at least one type selected from among letters, numerals and symbols, and a same solution being always generated under a same condition;

user encryption means that performs a processing of encrypting transmission data, which is to be transmitted, into encrypted data using the solution generated by the user solution generation means;

user transmission means that transmits the encrypted data to another apparatus;

user reception means that receives the encrypted data from another apparatus; and user decryption means that performs a processing of decrypting the received encrypted data using the solution generated by the user solution generation means into the transmission data, each of the user apparatuses is configured so that, if specified user apparatuses, which are two user apparatuses that are to perform encrypted communication, have a common initial solution, the specified user apparatuses are configured to support encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses, each of the user apparatuses is configured to transmit specification information, which is information that specifies both the specified user apparatuses, to the server apparatus from the user transmission means thereof, and the method comprises steps performed by the server apparatus that comprises one or more processors; and memory communicatively coupled to the one or more processors, the memory storing computer-executable means executable by the one or more processors, the computer-executable means including: server solution generation means configured to generate solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses, and the steps including:

a step of receiving the specification information from one of the specified user apparatuses;

a step of generating synchronization information, which is information required for the specified user apparatuses that obtain the same initial solution to synchronize the solutions between the specified user apparatuses, using the solution generated by the server solution generation means; and a step of transmitting the synchronization information to at least one of the specified user apparatuses, wherein the server apparatus is configured to transmit first information derived by performing a reversible operation on both a solution used as the initial solution and a solution that is configured to be generated by the user solution generation means in one of the specified user apparatuses as the synchronization information to the one of the specified user apparatuses, and transmit second information derived by performing a reversible operation on both the solution used as the initial solution and a solution that is configured to be generated by the user solution generation means in the other of the specified user apparatuses as the synchronization information to the other of the specified user apparatuses, and the one of the specified user apparatuses is configured to perform a reverse operation that is reverse to the reversible operation on the synchronization information transmitted from the server apparatus using a new solution generated by the user solution generation means to derive a solution from the synchronization information, which is the first information, and designate the derived solution as an initial solution, the other of the specified user apparatuses is configured to perform a reverse operation that is reverse to the reversible operation on the synchronization information transmitted from the server apparatus using a new solution generated by the user solution generation means to derive a solution that is common to the solution generated in the one of the specified user apparatuses from the synchronization information, which is the second information, and designate the derived solution as an initial solution, thereby allowing synchronization of the solutions between the user apparatuses.

13. One or more non-transitory computer readable storage media encoded with instructions that, when executed by a processor, cause a computer to function as a server apparatus that forms a communication system in cooperation with a large number of user apparatuses, the communication system including the large number of user apparatuses and the server apparatus, the user apparatuses being configured to communicate with each other via a network, and the server apparatus being connected to the network and controlling communication between the user apparatuses, wherein each of the user apparatuses has:

user solution generation means configured to successively generate solutions based on an initial solution, the generated solution being a string of a predetermined number of characters of at least one type selected from among letters, numerals and symbols, and a same solution being always generated under a same condition;

user encryption means that performs a processing of encrypting transmission data, which is to be transmitted, into encrypted data using the solution generated by the user solution generation means;

user transmission means that transmits the encrypted data to another apparatus;

user reception means that receives the encrypted data from another apparatus; and user decryption means that performs a processing of decrypting the received encrypted data using the solution generated by the user solution generation means into the transmission data, each of the user apparatuses is configured so that, if specified user apparatuses, which are two user apparatuses that are to perform encrypted communication, have a common initial solution, the specified user apparatuses are configured to support encrypted communication by the user solution generation means in each of the two user apparatuses generating common solutions synchronized between the two user apparatuses, thereby allowing the user decryption means in one of the user apparatuses to decrypt encrypted data generated from transmission data by the user encryption means in the other of the user apparatuses, transmitted from the other of the user apparatuses and received at the user reception means of the one of the user apparatuses, each of the user apparatuses is configured to transmit specification information, which is information that specifies both the specified user apparatuses, to the server apparatus from the user transmission means thereof, and the instructions further cause the computer to function as:

server reception means that receives the specification information from one of the specified user apparatuses;

server solution generation means configured to generate solutions that are the same as the solutions generated by the user solution generation means in each of the user apparatuses and is synchronized with the solution generated by the user solution generation means in each of the user apparatuses, based on initial solutions that are the same as the initial solutions in the user apparatuses that are different between the user apparatuses;

synchronization information generation means that generates synchronization information, which is information required for the specified user apparatuses that obtain the same initial solution to synchronize the solutions between the specified user apparatuses, using the solution generated by the server solution generation means; and server transmission means that transmits the synchronization information to at least one of the specified user apparatuses, wherein the server apparatus is configured to transmit first information derived by performing a reversible operation on both a solution used as the initial solution and a solution that is configured to be generated by the user solution generation means in one of the specified user apparatuses as the synchronization information to the one of the specified user apparatuses, and transmit second information derived by performing a reversible operation on both the solution used as the initial solution and a solution that is configured to be generated by the user solution generation means in the other of the specified user apparatuses as the synchronization information to the other of the specified user apparatuses, and the one of the specified user apparatuses is configured to perform a reverse operation that is reverse to the reversible operation on the synchronization information transmitted from the server apparatus using a new solution generated by the user solution generation means to derive a solution from the synchronization information, which is the first information, and designate the derived solution as an initial solution, the other of the specified user apparatuses is configured to perform a reverse operation that is reverse to the reversible operation on the synchronization information transmitted from the server apparatus using a new solution generated by the user solution generation means to derive a solution that is common to the solution generated in the one of the specified user apparatuses from the synchronization information, which is the second information, and designate the derived solution as an initial solution, thereby allowing synchronization of the solutions between the user apparatuses.

* * * * *